United States Patent
Grinkemeyer

(10) Patent No.: US 10,382,314 B2
(45) Date of Patent: Aug. 13, 2019

(54) SYSTEMS AND METHODS FOR AUTOMATED TESTING OF MOCA NETWORKS

(71) Applicant: Spirent Communications, Inc., San Jose, CA (US)

(72) Inventor: Douglas Grinkemeyer, Germantown, MD (US)

(73) Assignee: Spirent Communications, Inc., San Jose, CA (US)

(*) Notice: Subject to any disclaimer, the term of this patent is extended or adjusted under 35 U.S.C. 154(b) by 17 days.

(21) Appl. No.: 15/456,313

(22) Filed: Mar. 10, 2017

(65) Prior Publication Data

US 2017/0264528 A1 Sep. 14, 2017

Related U.S. Application Data

(60) Provisional application No. 62/307,392, filed on Mar. 11, 2016.

(51) Int. Cl.

| H04L 12/26 | (2006.01) |
|---|---|
| H04L 12/24 | (2006.01) |
| H04L 12/28 | (2006.01) |
| H04W 24/08 | (2009.01) |
| H04W 84/12 | (2009.01) |

(52) U.S. Cl.
CPC .......... H04L 43/50 (2013.01); H04L 12/2801 (2013.01); H04L 41/0659 (2013.01); H04W 24/08 (2013.01); *H04L 41/22* (2013.01); *H04L 43/0811* (2013.01); *H04W 84/12* (2013.01)

(58) Field of Classification Search
CPC . H04L 43/50; H04L 12/2801; H04L 41/0677; H04L 1/244; H04L 2012/40208; H04L 12/2856; H04W 24/08; H04W 84/12; H04M 3/28; H04M 3/308; H04M 3/306; H04T 2001/211; H04T 2001/217; H04B 17/0085; H04N 1/32625
See application file for complete search history.

(56) References Cited

U.S. PATENT DOCUMENTS

| 4,484,218 A | 11/1984 | Boland et al. |
|---|---|---|
| 6,889,255 B1 | 5/2005 | DeLuca |
| 6,891,803 B1 | 5/2005 | Chang et al. |
| 7,075,981 B1 | 7/2006 | Clark |

(Continued)

OTHER PUBLICATIONS

Wireless Broadband Router MI424WR, Rev. 1 User Manual, Verizon, 2011, 205 pages.

(Continued)

*Primary Examiner* — Andrew Lai
*Assistant Examiner* — Harry H Kim
(74) *Attorney, Agent, or Firm* — Haynes Beffel & Wolfeld LLP; Ernest J. Beffel, Jr.; Andrew L. Dunlap

(57) ABSTRACT

The present invention relates to testing signals on a coaxial home network that carries a digital video signal. It has direct application to testing Multimedia over Coax Alliance (MoCA) standards-compliant networks and applies to similar networks such as Data Over Cable Service Interface Specification (DOCSIS), Ethernet, and Wi-Fi. An embedded expert system can guide an inexperienced operator through the process of evaluating and resolving problems with a home network with little operator input.

19 Claims, 11 Drawing Sheets

(56) References Cited

U.S. PATENT DOCUMENTS

| | | | |
|---|---|---|---|
| 7,212,496 | B1 | 5/2007 | Chong |
| 7,433,925 | B1 | 10/2008 | Shankar et al. |
| 7,459,898 | B1 | 12/2008 | Woodings |
| 7,587,029 | B2 | 9/2009 | Pepper et al. |
| 7,964,989 | B1 | 6/2011 | Puschnigg et al. |
| 8,146,125 | B2 | 3/2012 | Grinkemeyer et al. |
| 8,179,838 | B2 | 5/2012 | Tang et al. |
| 8,767,688 | B2 | 7/2014 | Qian et al. |
| 9,191,282 | B2 | 11/2015 | Kakadia et al. |
| 2002/0010854 | A1 | 1/2002 | Ogura et al. |
| 2004/0073437 | A1 | 4/2004 | Halgas et al. |
| 2004/0124864 | A1 | 7/2004 | Feld et al. |
| 2006/0221876 | A1 | 10/2006 | Kosanovic et al. |
| 2006/0234698 | A1 | 10/2006 | Fok et al. |
| 2006/0264178 | A1 | 11/2006 | Noble et al. |
| 2007/0121712 | A1 | 5/2007 | Okamoto |
| 2007/0234135 | A1 | 10/2007 | Boyes et al. |
| 2008/0013612 | A1 | 1/2008 | Miller et al. |
| 2008/0089239 | A1 | 4/2008 | Todd et al. |
| 2008/0120675 | A1 | 5/2008 | Morad et al. |
| 2008/0285476 | A1 | 11/2008 | Rajakarunanayake |
| 2009/0031185 | A1 | 1/2009 | Xhafa et al. |
| 2009/0046595 | A1 | 2/2009 | Clark |
| 2009/0113045 | A1 | 4/2009 | Kozisek |
| 2009/0147719 | A1 | 6/2009 | Kang |
| 2009/0248794 | A1 | 10/2009 | Helms et al. |
| 2009/0282455 | A1 | 11/2009 | Bell et al. |
| 2009/0296584 | A1 | 12/2009 | Bernard et al. |
| 2009/0303876 | A1 | 12/2009 | Wu |
| 2009/0328098 | A1 | 12/2009 | Beyabani |
| 2010/0150319 | A1 | 6/2010 | Irenze et al. |
| 2010/0315942 | A1 | 12/2010 | Jackson et al. |
| 2010/0324855 | A1 | 12/2010 | Parker |
| 2011/0001833 | A1* | 1/2011 | Grinkemeyer .......... H04H 20/12 348/192 |
| 2011/0022641 | A1 | 1/2011 | Werth et al. |
| 2011/0055632 | A1 | 3/2011 | Zimmerman |
| 2011/0107220 | A1 | 5/2011 | Perlman |
| 2011/0107389 | A1 | 5/2011 | Chakarapani |
| 2011/0125897 | A1 | 5/2011 | Qian et al. |
| 2011/0149720 | A1 | 6/2011 | Phuah et al. |
| 2012/0078994 | A1 | 3/2012 | Jackowski et al. |
| 2012/0140641 | A1 | 6/2012 | Reese et al. |
| 2012/0155358 | A1* | 6/2012 | Hao ....................... H04L 12/189 370/312 |
| 2012/0207030 | A1* | 8/2012 | Luong ................... H04W 24/06 370/245 |
| 2012/0239794 | A1 | 9/2012 | Klein |
| 2013/0222640 | A1 | 8/2013 | Baek et al. |
| 2013/0343467 | A1 | 12/2013 | Sogani et al. |
| 2014/0105036 | A1 | 4/2014 | Anschutz |
| 2014/0108898 | A1* | 4/2014 | Kang ..................... G06F 17/24 715/202 |
| 2014/0130111 | A1 | 5/2014 | Nulty et al. |
| 2014/0156226 | A1* | 6/2014 | Hashemian ......... G01F 25/0007 702/185 |
| 2014/0187173 | A1* | 7/2014 | Partee ................... H04L 43/045 455/67.12 |
| 2014/0254392 | A1 | 9/2014 | Wolcott et al. |
| 2014/0359389 | A1 | 12/2014 | Seastrom et al. |
| 2015/0029869 | A1 | 1/2015 | Wolcott et al. |
| 2017/0094703 | A1* | 3/2017 | Matsuda ................ H04N 19/40 |
| 2017/0264502 | A1* | 9/2017 | Kahkoska ............... H04L 41/22 |
| 2017/0302994 | A1* | 10/2017 | Kumar ................ H04L 41/0253 |

OTHER PUBLICATIONS

Hardware Design Guide, MoCA 2.0 Network Interface using the EN2710, EN1410 and EN 1050 Chip Set, Entropic Communications, 2011, 46 pages.

Ethernet to Coax MoCA Network Adapter model ECB2200, Actiontec.com, 2009, 2 pages.

Spirent Tech-X Flex Field Test Solution for Telcos and MSOs, Spirent Communications, 2012, 4 pages.

The Future of MPEG Video Transport Over QAM, CED magazine, Dec. 4, 2013, 10 pages, accssed at (http://www.cedmagazine.com/article/2013/01/future-mpeg-video-transport-over-qam).

Deploying Enhanced Media Services with MoCA, The Challenges and Rewards of MoCA Deployment for the Home Network, Society of Cable Telecommunications Engineers, 2009, 29 pages, accessed at (http://www.mocalliance.org/marketing/whitepapers/Branded_Implication_Paper_MoCA.pdf).

Telchemy—VQmon/EP, VQmon Performance, accessed on Dec. 30, 2008 at http://www.telchemy.com/vqmonperf.html, pp. 1-4.

Clark, Alan, "Non-Intrusive Monitoring of VoIP Call Quality," Telchemy Incorporated, 2002, pp. 1-29.

VQmon/SA-VM 2.2, Telchemy, Incorporated, 2006, pp. 1-2.

CompuLab Products page CM-X270 Computer-On-Module, accessed on Dec. 30, 2008 at http://www.compuland.co.il/x270cm/html/x270-cm-datasheet.htm, pp. 1-4.

Stascheit, Bernhard, et al., "The Use of Ethernet-Over-Coax in HFC Networks", 2007, 5 pgs.

U.S. Appl. No. 12/496,545—Non-final Office Action dated Jul. 21, 2011, 19 pages.

U.S. Appl. No. 12/496,545—Response to Non-final Office Action dated Jul. 21, 2011, dated Oct. 20, 2011 12 pages.

U.S. Appl. No. 12/496,545—Notice of Allowance dated Nov. 30, 2011, dated Oct. 20, 2011, 8 pages.

U.S. Appl. No. 13/353,026—Non-final Office action dated Nov. 26, 2014, 21 pages.

U.S. Appl. No. 13/353,026—Response to Non-final Office action dated Nov. 26, 2014 dated May 22, 2015, 78 pages.

U.S. Appl. No. 13/353,026—Non-final Office action dated Sep. 28, 2015, 50 pages.

U.S. Appl. No. 13/353,026—Response to Non-final Office action dated Sep. 28, 2015, dated Jan. 28, 2016, 28 pages.

U.S. Appl. No. 13/353,026—Final Office action dated May 19, 2016, 49 pages.

U.S. Appl. No. 13/353,026—Response to Final Office action dated May 19, 2016, dated Jul. 25, 2016, 53 pages.

U.S. Appl. No. 13/353,026—Advisory action dated Sep. 6, 2016, 10 pages.

U.S. Appl. No. 13/353,026—Rule 131 Affidavit filed Feb. 16, 2017, Sep. 6, 2016, 175 pages.

U.S. Appl. No. 13/353,026—Non-final Office action dated Mar. 8, 2017, 30 pages.

Monk, A., et al., "The Multimedia Over Coax Alliance," Proceedings of the IEEE, San Diego, CA, Copyright 2013, 17 pages.

"MoCA Installation and Troubleshooting Reference Guide," Cisco Systems Inc., Lawrenceville, GA, Copyright Aug. 2012, 26 pages.

Ansley, C., MoCA Troubleshooting Experiences, Recommendations for Efficient Installations, Suwanee, GA, Retrieved online: <http://www.arrisi.com/dig_lib/white_papers/_docs/MoCA_Troubleshooting.pdf>, accessed Jan. 20, 2015, 17 pages.

"MoCA Networking FAQ and Troubleshooting," TiVo Inc., Copyright 2013, Retrieved online: <http://support.tivo.com/app/answers/detail/a_id/2412>, accessed Jan. 20, 2015, 3 pages.

U.S. Appl. No. 14/810,898—Non-final Office Action dated Jul. 28, 2016, 20 pages.

U.S. Appl. No. 14/810,898—Non-final Office Action dated Jul. 28, 2016, filed Aug. 24, 2016, 9 pages.

U.S. Appl. No. 14/810,898—Final Office Action dated Sep. 23, 2016, 21 pages.

U.S. Appl. No. 14/810,898—Response to Final Office Action dated Sep. 23, 2016, filed Nov. 17, 2016, 8 pages.

"CPE WAN Management Protocol v1.1—TR-069," Broadband Forum, Technical Report, Version 1 Amendment 2, Version Date of Dec. 2007, 138 pages.

U.S. Appl. No. 14/810,898—Advisory Action dated Dec. 9, 2016, 7 pages.

U.S. Appl. No. 14/810,898—Response to Advisory Action dated Dec. 9, 2016, filed Dec. 23, 2016, 10 pages.

U.S. Appl. No. 13/353,026—Response to Non-final Office action dated Mar. 8, 2017, filed Jul. 31, 2017, 16 pages.

U.S. Appl. No. 13/353,026—Final Office action dated Nov. 2, 2017, 40 pages.

(56) References Cited

OTHER PUBLICATIONS

U.S. Appl. No. 13/353,026—Response to Final Office action dated Nov. 2, 2017, filed Jan. 29, 2018, 13 pages.
U.S. Appl. No. 13/353,026—Notice of Allowance dated Mar. 28, 2018, 18 pages.
U.S. Appl. No. 14/810,898—Response to Final Office Action dated Sep. 23, 2016, filed Dec. 23, 2016, 13 pages.
U.S. Appl. No. 14/810,898—Non-Final Office Action dated Aug. 29, 2016, 31 pages.
U.S. Appl. No. 14/810,898—Response to Non-Final Office Action dated Aug. 29, 2017, filed Feb. 28, 2018, 13 pages.
U.S. Appl. No. 12/496,5452, filed Jul. 1, 2009, U.S. Pat. No. 8,146,125, Mar. 27, 2012.
U.S. Appl. No. 13/353,036, filed Jan. 18, 2002, U.S. Pat. No. 10/033,618, Jul. 24, 2018.
U.S. Appl. No. 14/81,898, filed Jul. 28, 2017, 2017/0034506A1, Feb. 2, 2017.

* cited by examiner

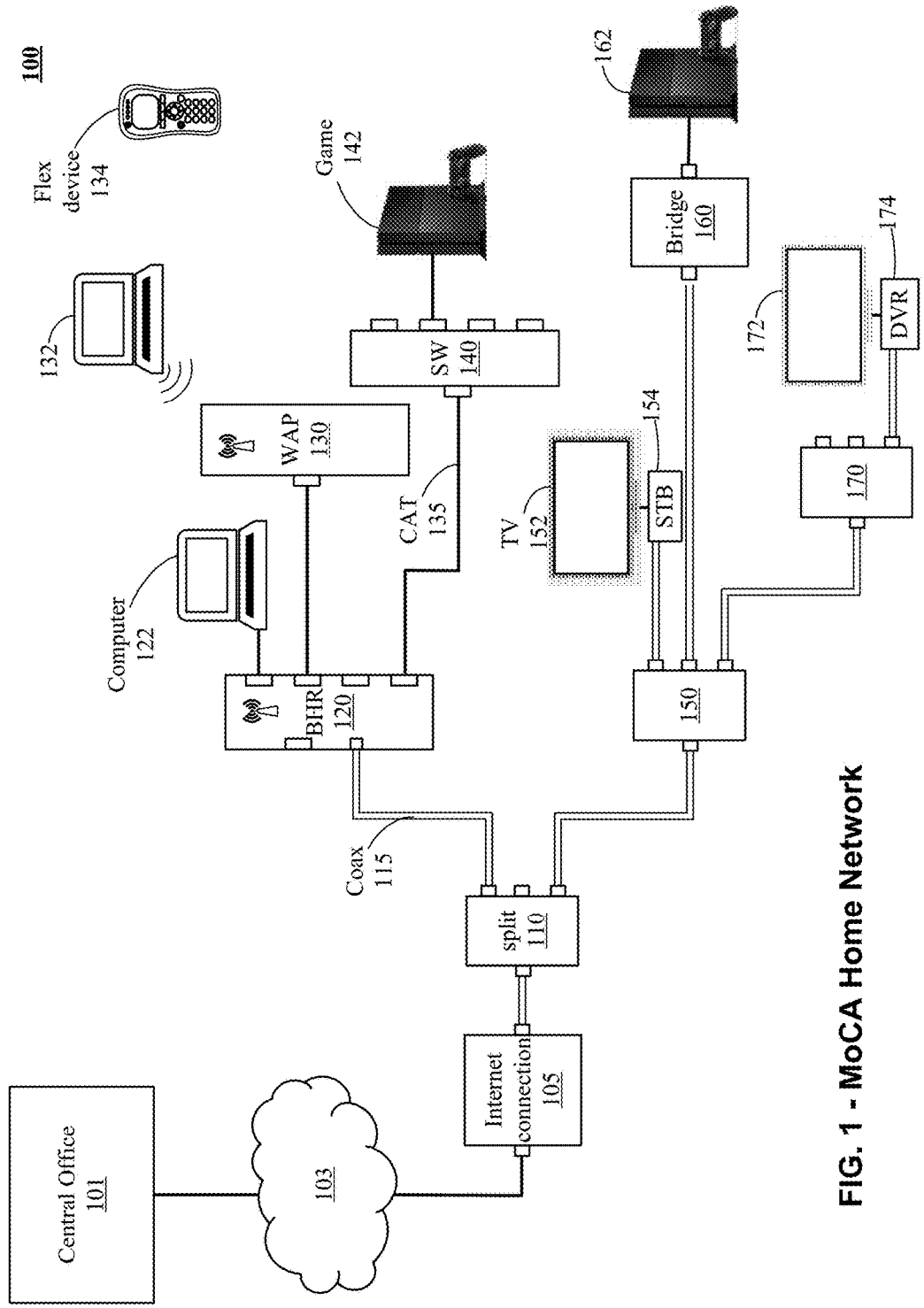
FIG. 1 - MoCA Home Network

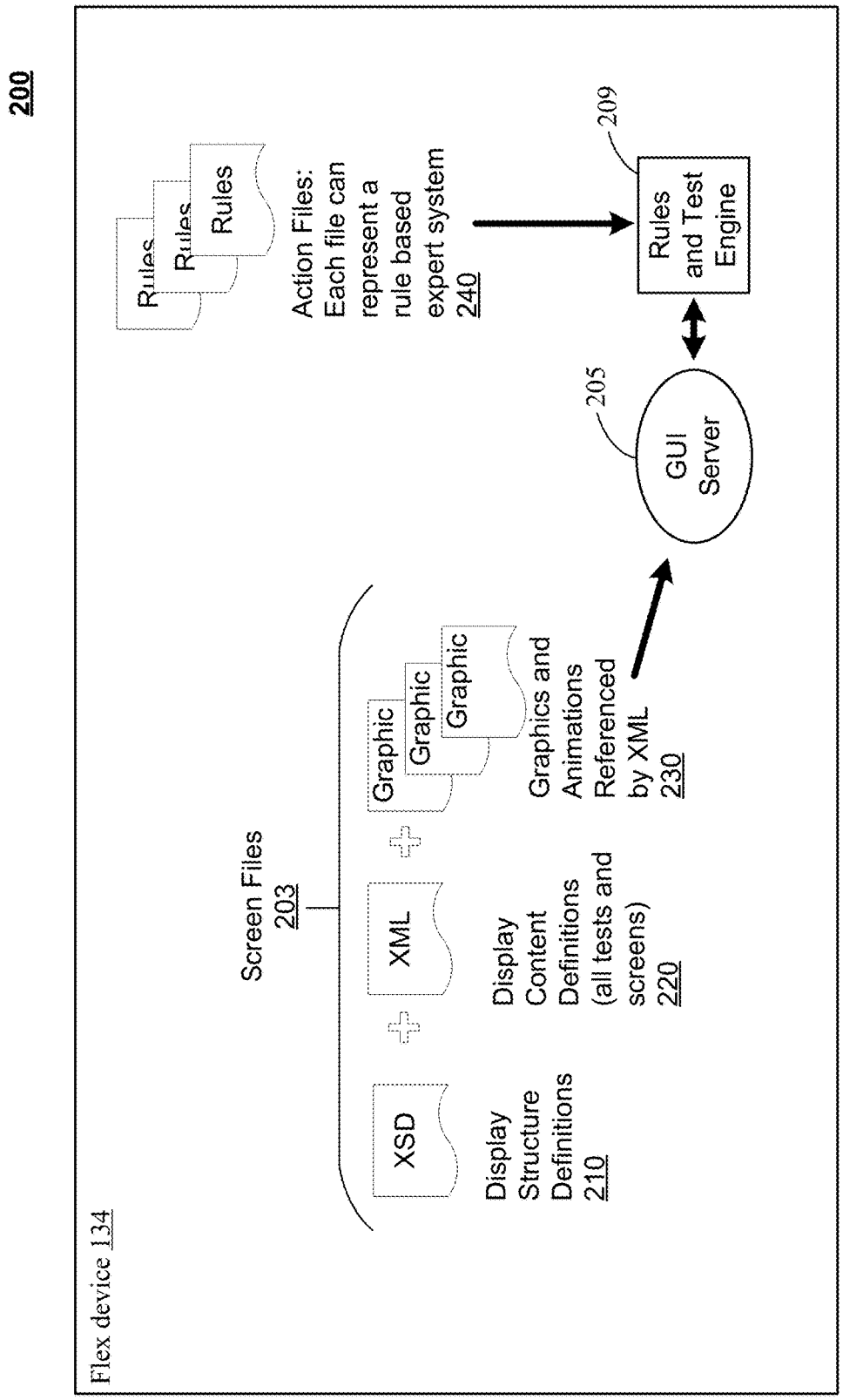
FIG. 2 Block Diagram

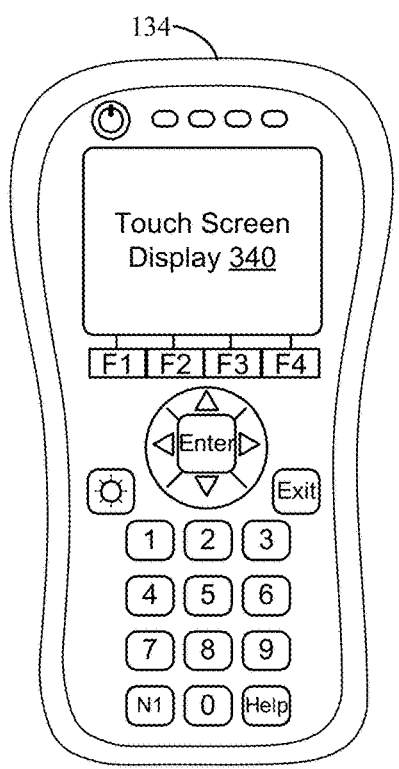
FIG. 3A Flex Device
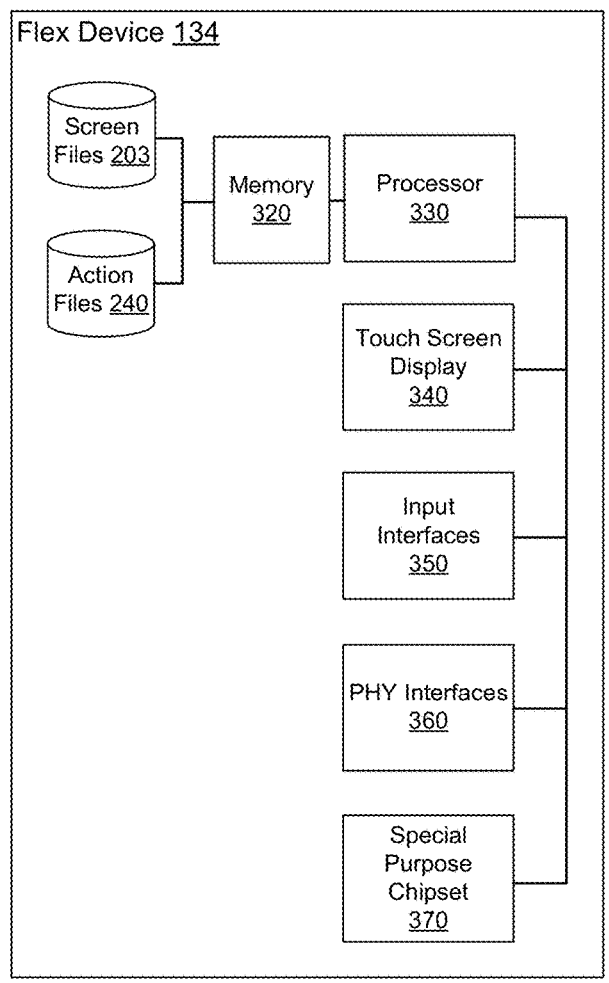
FIG. 3B Components of Flex Device

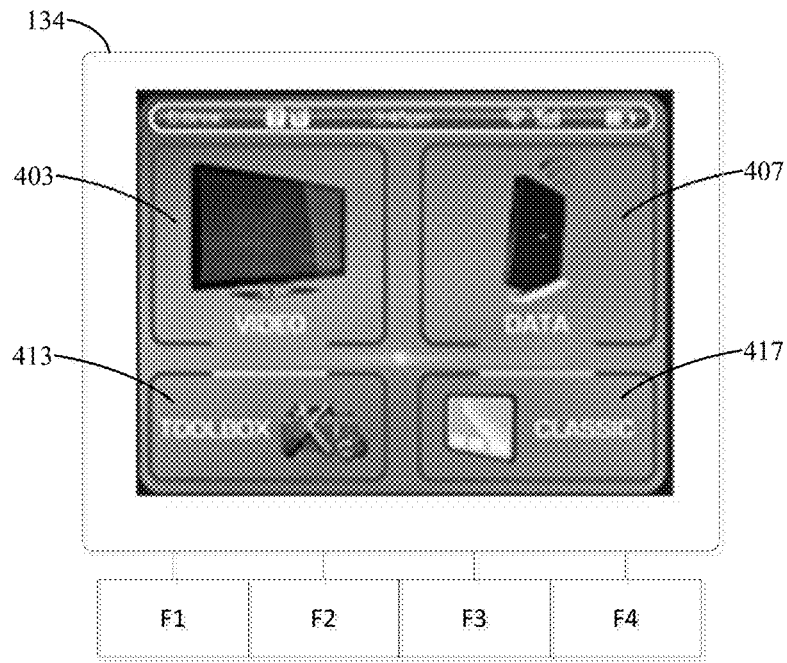
FIG. 4A Display
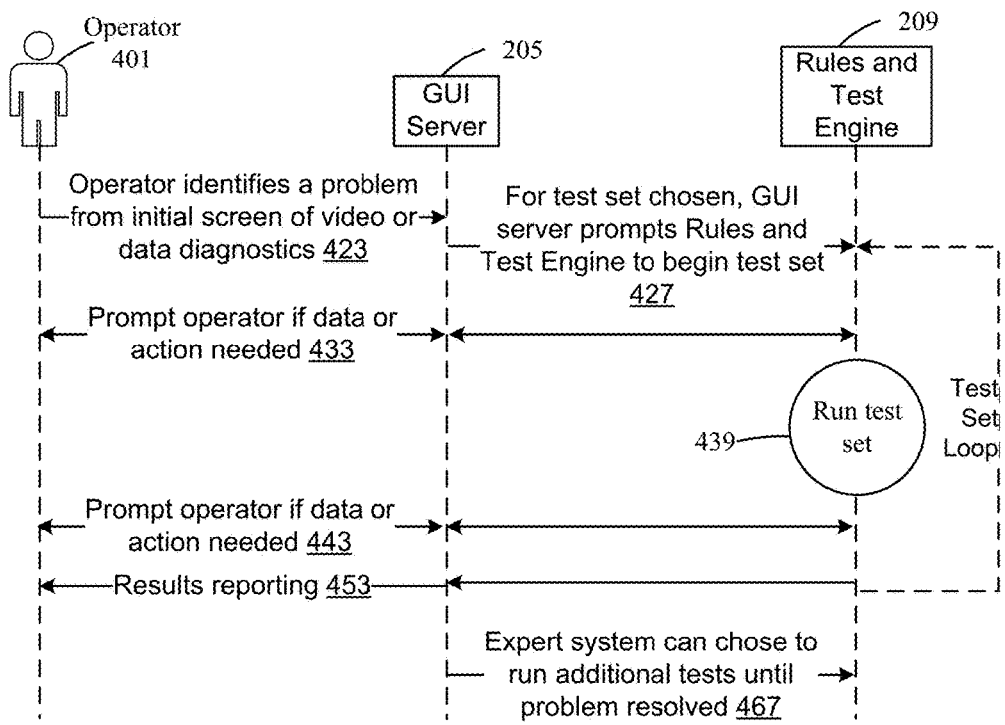
FIG. 4B Message Map

MRDVR Test

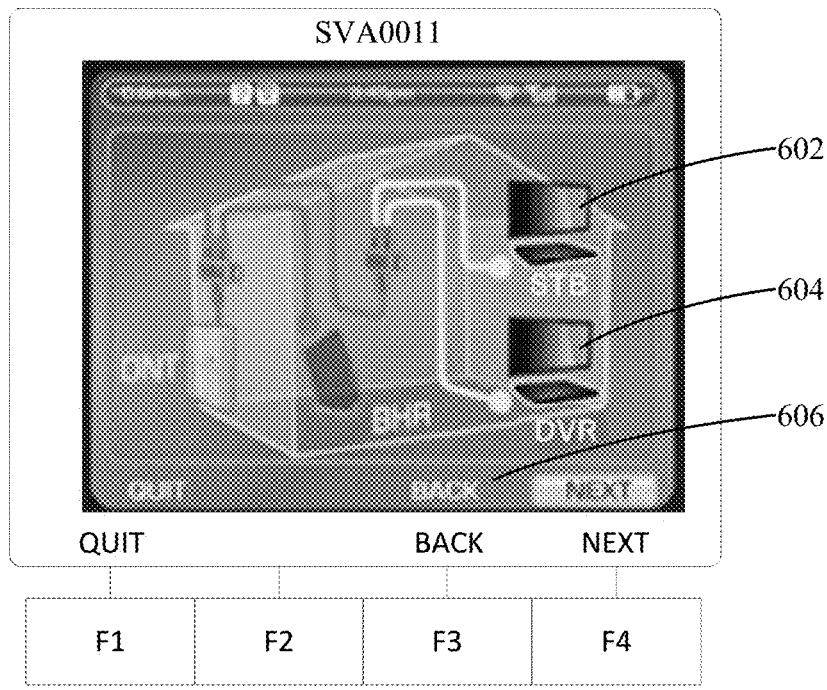
FIG. 6A – Multi-Room DVR
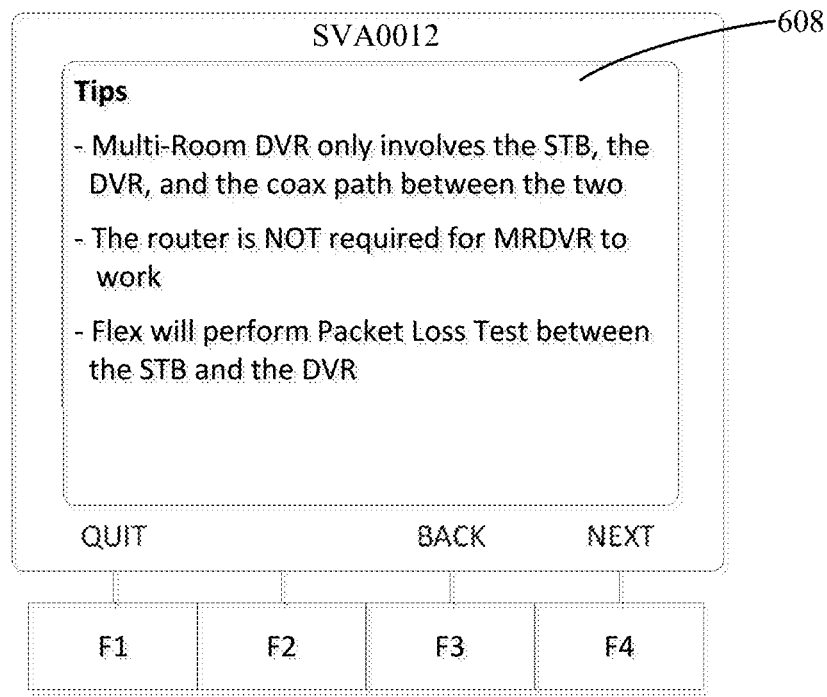
FIG. 6B – Tips for Multi-Room DVR

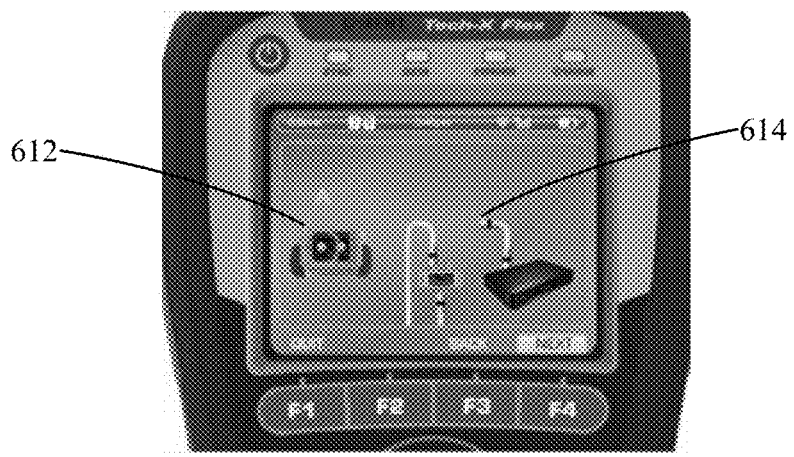
FIG. 6C – Beginning of animation to prepare STB for test
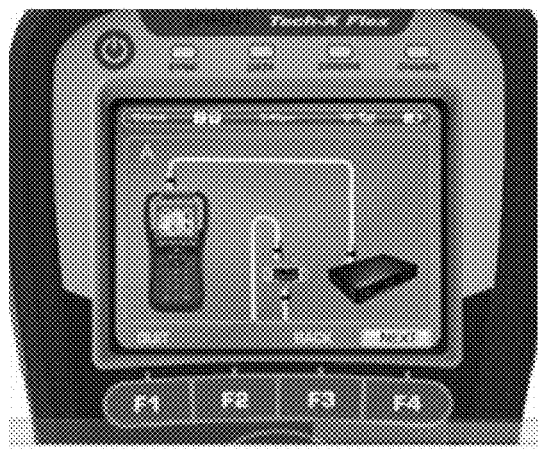
FIG. 6D – End of animation to prepare STB for test

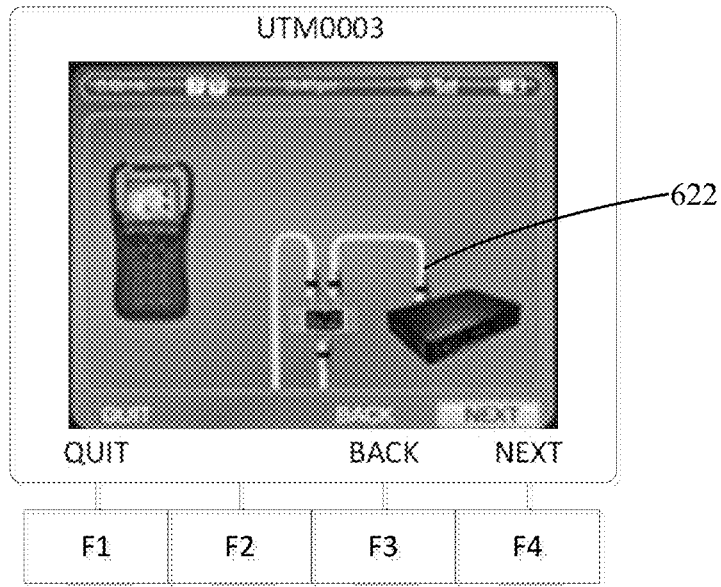
FIG. 6E – Animation for beginning of segmentation test
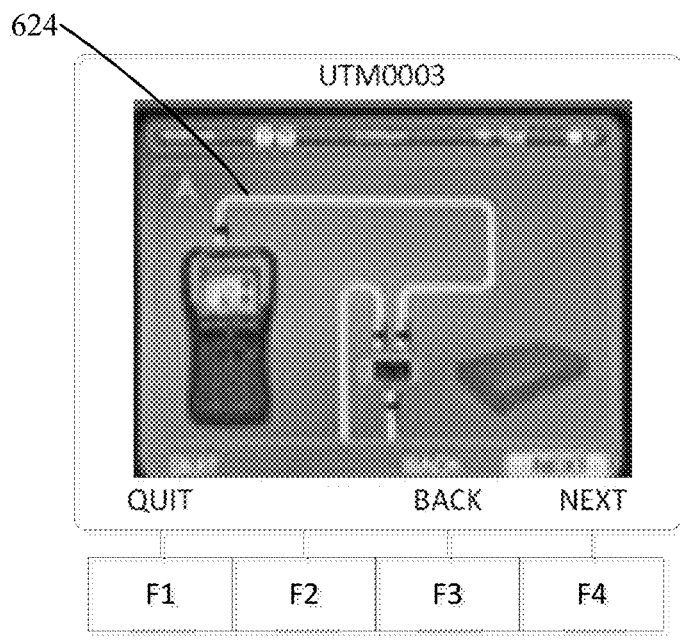
FIG. 6F – End of animation for beginning of segmentation test

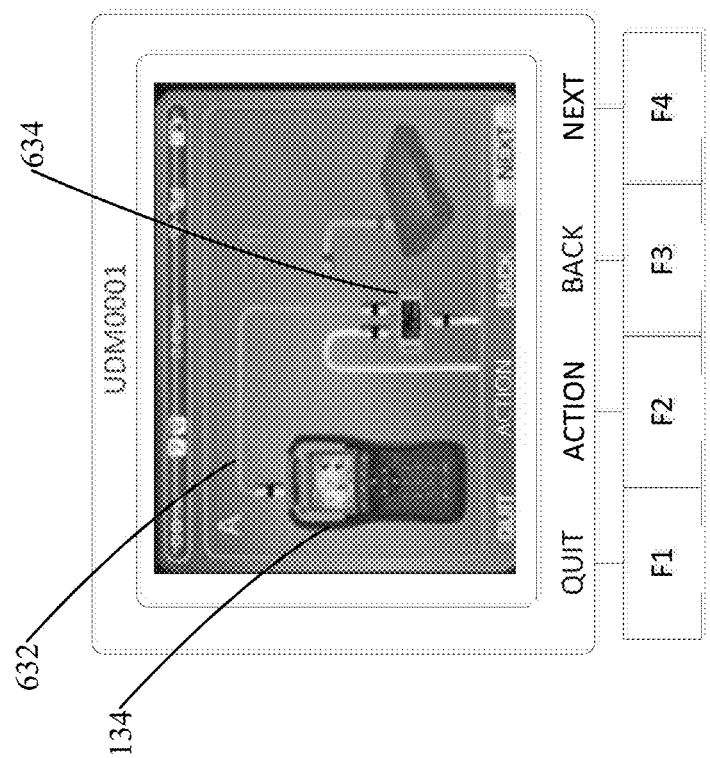
FIG. 6G – Replacing a first coax cable with a tested, good cable

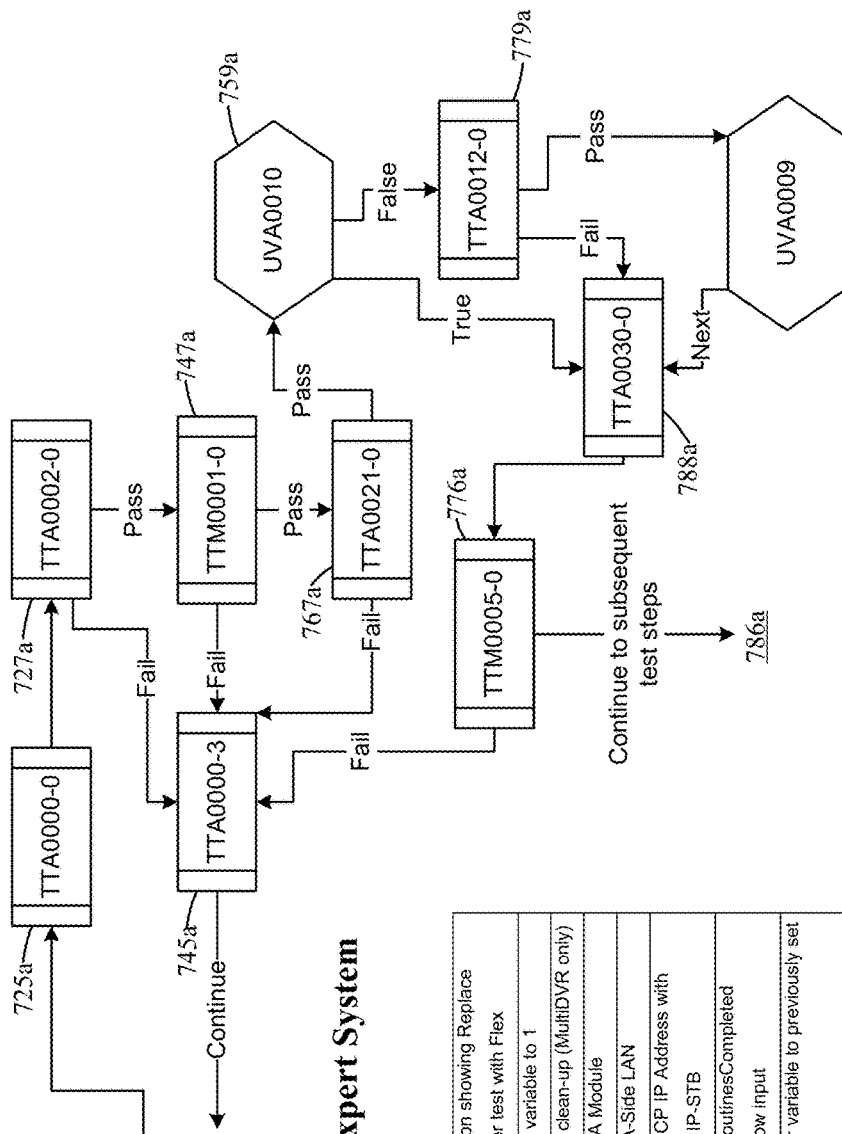
FIG. 7A – Directed Graph
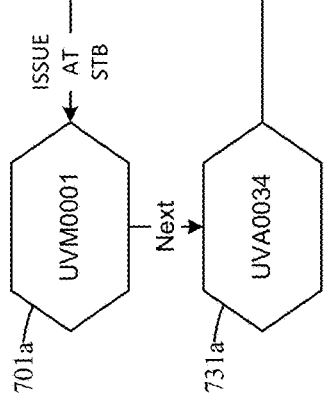
FIG. 7B – Rule Based Expert System

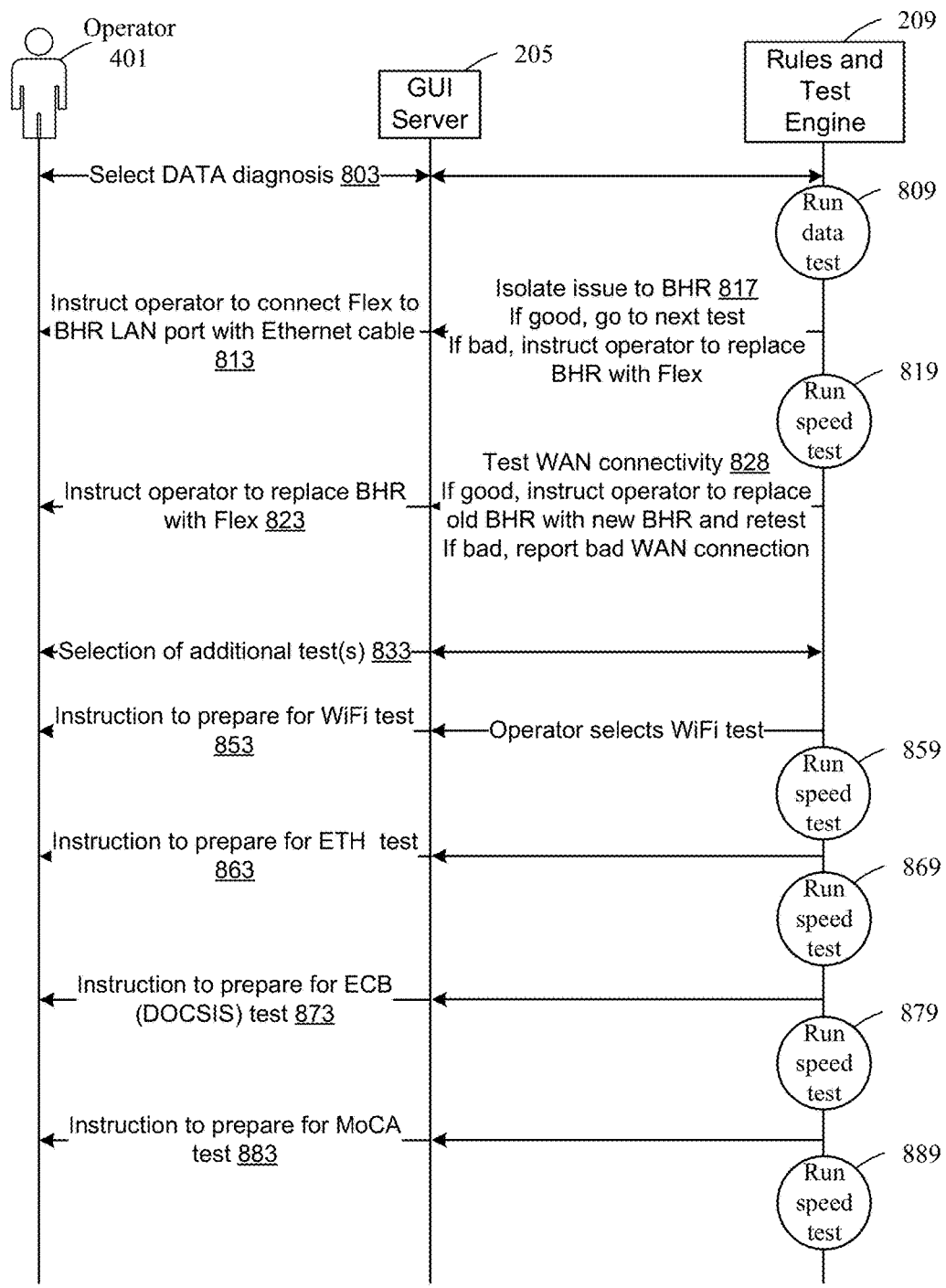
FIG. 8 Data Test

SYSTEMS AND METHODS FOR AUTOMATED TESTING OF MOCA NETWORKS

RELATED APPLICATIONS

This application claims priority to and the benefit of U.S. Provisional Application No. 62/307,392, filed Mar. 11, 2016 and titled "SYSTEMS AND METHODS FOR AUTOMATED TESTING OF MOCA NETWORKS". The priority application is incorporated by reference for all purposes.

This application is related to U.S. Pat. No. 8,146,125, entitled, "COMPUTERIZED DEVICE AND METHOD FOR ANALYZING SIGNALS IN A MULTIMEDIA OVER COAX ALLIANCE (MOCA) NETWORK AND SIMILAR TDM/ENCRYPTED NETWORKS" of Mar. 27, 2012.

This application is related to U.S. patent application Ser. No. 13/353,026, entitled "SYSTEMS AND METHODS FOR EVALUATING CUSTOMER PREMISES NETWORKS", of Jan. 18, 2012. The related applications are incorporated by reference for all purposes.

BACKGROUND

A prior generation of a device for analyzing signals on a coaxial home network has been used to make many technical measurements on multimedia over coax alliance (MoCA) networks. For example, the earlier generation device measured the contributions of various packet errors to signal degradation, including packet loss, jitter, and latency. The device made it possible to monitor traffic between two active devices, tap into the line to measure throughput, and provide raw statistics to technically trained personnel. It was useful to technicians with strong technical insight, who were capable of deciphering the statistics delivered and determining what actions to take to identify and repair faults in a home network. The prior generation device, used to test MoCA signals routed to a set-top-box and evaluate performance of the set-top-box, uses parts of the technology disclosed in U.S. Pat. No. 8,146,125 entitled, "Computerized Device and Method for Analyzing Signals in a Multimedia over Coax Alliance (MoCA) Network and Similar TDM/Encrypted Networks" which is hereby incorporated by reference.

SUMMARY

For this generation of device, the inventors identified an opportunity to develop an expert system for debugging home networks, a system that automatically analyzes technical statistics and directs the debug and repair process. An expert system that responds directly to measurements made with special purpose hardware can transform the home network debug and repair process. In this disclosure, we introduce an expert system emulating components of a home network, isolating potentially faulty segments of the network and measuring communication between components to determine faults.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 illustrates a home network with MoCA and wireless components, which the technology disclosed can be used to diagnose.

FIG. 2 illustrates a block diagram of software for an example Flex device.

FIGS. 3A-3B illustrate a form factor and block diagram of the example Flex hardware.

FIGS. 4A-4B illustrates one implementation of a GUI interface and a message map supporting user interaction with an expert diagnostic system.

FIGS. 6A-6G illustrate images from a Graphical User Interface (GUI) that can be used to lead a technician through isolating network segments.

FIGS. 7A-7B illustrate an example of a directed graph mapping to a rule-based expert system.

FIG. 8, like FIG. 5, illustrates an example of messaging during test of data access across various physical layers in the home network.

DETAILED DESCRIPTION

Introduction

Figure 5:
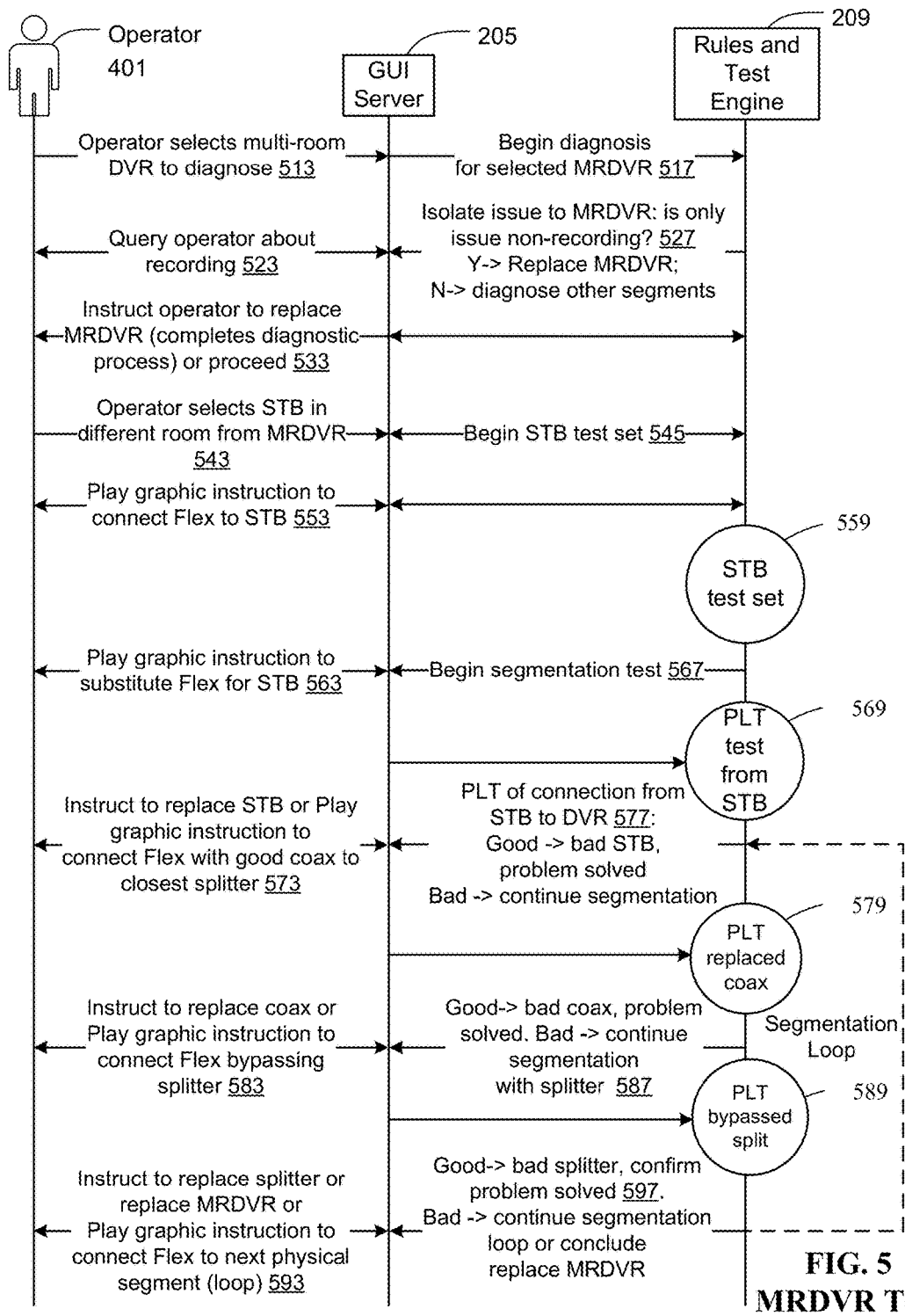
FIG. 5 illustrates one example of messaging during a Multi-Room Digital Video Recorder (MRDVR) test.

The increasing demands for network bandwidth in the home, for applications such as high definition (HD) television, interactive gaming, video on demand (VOD) and digital video recorders (DVR), requires increasingly complex in-home networking. Technologies such as MoCA and data over cable service interface specification (DOCSIS) are being implemented to address these demands. However, incompatibilities between competing technologies and inevitable failure of active and passive devices create a need for expert knowledge in the field to maintain and repair equipment. This growing need challenges technical support organizations. Tens of millions of homes have been equipped with MoCA technology, and the number continues to grow. It will be impractical to scale a support workforce possessing the technical competence currently required to service this growing infrastructure.

The technology disclosed reduces the technician expertise needed in the field by providing an expert system, such as a rule-based or directed graph expert system. In the hands of a relatively inexperienced operator, an expert system can select and perform a sequence of complex tests running on special purpose hardware to solve a problem generically identified by the operator. This can decrease the service time for a truck roll, reduce inappropriate equipment replacement, and improve customer satisfaction.

Historically, cable delivery of home entertainment has involved the use of MPEG video transport. Cable television providers encode and transmit cable channels using quadrature amplitude modulation (QAM) over coaxial cable or "coax". As IP-based packet traffic becomes more integrated with video devices in the home, new standards, such as those created by the MoCA organization, have been developed to take advantage of this integration. MoCA is a technology that allows a coax network to carry additional signals that travel on a frequency band mostly unused by cable TV transmissions.

Using the technology disclosed, diagnostic errors by technicians can be reduced by automatically capturing data from the network itself, such as DHCP addressing for devices, technical information about the signal strength and bandwidth of wireless transceivers, and operational frequencies for various MoCA channels. Use of an expert system helps to avoid human bias towards preconceived solutions. Once the disclosed expert system is invoked, it can emulate a variety of devices and perform a number of role-specific tests. Results of tests are immediately and automatically used to select further tests and, ultimately, identify a fault and direct a technician's response to correct the fault.

FIG. 1—MoCA Home Network

FIG. 1 illustrates an example home network in which the technology disclosed can be used to find faults or errors. Home networks of this sort offer integrated wired and wireless Ethernet traffic with coax-based MoCA traffic. Problems with MoCA and wireless portions of the network to be diagnosed can include replay of videos stored in a DVR, Ethernet device errors in traffic through a Broadband Home Router (BHR) or Access Point (WAP), and physical layer issues with cabling, connectors and splitters. The environment illustrated in FIG. 1 includes a connection to a Wide Area Network (WAN) 103 with an internet connection 105 and an entry point adapter such as an Optical Network Terminal (ONT) or coax connection. The WAN can be MoCA-compliant. The home MoCA LAN 100 typically includes a coax cable 115, illustrated as double lines between devices, and an Ethernet cable 135, drawn as a single line. The WAN 103 can connect to a Central Office 101 with a head end that exchanges data with the home in-home LAN 100.

The home MoCA LAN 100 includes a Broadband Home Router (BHR) 120 connected through a passive first splitter 110, via a coax cable 115. The BHR is also coupled to the internet connection 105. In one example, the BHR 120 is an Actiontec MI424WR wireless broadband router, which acts as a server for DHCP, NAT, signal decryption, and other common home router services. The BHR 120 can integrate both the Wi-Fi and Ethernet networks with QAM in compliance with MoCA standards.

In this example, a first computer 122 is connected to the BHR 120 by an Ethernet cable. A Wireless Access Point (WAP) 130, that supports wireless technologies such as IEEE 802.11b, a, g, n, and ac, is also connected to the BHR 120 via an Ethernet cable or integrated into the BHR. A second computer 132 is connected wirelessly to the WAP 130 or BHR 120. Similarly an Ethernet switch 140 can be connected to the BHR 120 via an Ethernet cable 135 or integrated into the BHR. A first gaming system 142 can be connected to the Ethernet switch 140 via an Ethernet cable.

A second splitter 150 can be connected to the first splitter 110 via coax cable, and a Set Top Box (STB) 154 via coax cable. The set top box 154 can be connected to a first television 152 with a technology such as HDMI or Component Video. A MoCA bridge 160 can be connected to the second splitter 150 via coax cable, and to a second gaming system 162 via Ethernet. A third splitter 170 can be connected to the second splitter 150. And a Digital Video Recorder (DVR) 174 can be connected to the third splitter 170 via a coax cable. A second television 172 can then be connected to the DVR 174 with a technology such as HDMI or Component Video.

A Flex device 134 using the technology disclosed can be inserted into the home MoCA LAN 100 in a plurality of positions, which physically isolate portions of the MoCA LAN 100 for testing. For example, the Flex device 134 can assume the role of the first computer 122 with an Ethernet connection, the second computer 132 with a wireless connection, the BHR 120, the WAP 130, a gaming system 142, 162, the STB 154, a TV 152, 172, or the DVR 174.

The Flex device 134 is capable of performing a plurality of tests for a home MoCA LAN 100. These tests can be run individually by an operator, with technical results of each test presented to the operator for expert analysis. In this scenario, known as classic mode, the operator decides which test of the plurality of tests is to be run, the order that tests are to be run, and the significance of any results obtained by each individual test. These tests can be extremely complicated, with equally complicated results.

In an expert system mode, the technology disclosed can direct the operator to a starting place toward the best place in the home MoCA LAN 100 to insert the Flex device 134 based on a general problem type identified by the operator. The technology disclosed can then choose one or more tests to run autonomously, process the results of the tests, and instruct the operator as to whether there is a problem in that portion of the home MoCA LAN 100, how to remediate the problem. Details of the Flex device 134 are shown in the block diagram illustrated in FIG. 2.

FIG. 2—Block Diagram

FIG. 2 illustrates a block diagram of software 200 for an example Flex device. The Flex device 134 comprises a set of specialized hardware, screen files 203 that define the text and graphics displayed on the device, and action files 240 that describe the actions to be taken based on various inputs.

Screen display-related files 203 can include an XSD or other schema file 210, a display XML or other markup data file 220, and graphic files 230. An XSD file 210 can be used to define the schema of the display XML file 220. The display XML file 220 contains the information that is displayed on each screen, and links to the actions that can be followed based on inputs. The actions that can occur include the rendering of other screens defined within the display XML, file 220, the rendering of graphics files 230, such as animations, or the invocation of action files 240. An action file 240 defines the rules of an expert system. Screen files are rendered on the display by a GUI server 205, such as a browser or light weight client app. Action files are processed by a rules and test engine 209, which can communicate with the GUI server 205 to request more information from an operator, or to supply information and instructions to the operator. The specialized hardware of the Flex device 134 is described with reference to FIG. 3.

FIG. 3—Hardware Description

FIGS. 3A-3B (collectively FIG. 3) illustrate a form factor FIG. 3A and block diagram FIG. 3B of the example Flex device 134, which is a third generation device on which the expert system disclosed can operate. A first generation device was a dedicated tester device with a display, described without an expert system. An example first generation device is described in U.S. Pat. No. 8,146,125. A second generation device divided functions between a special purpose test device, without a display, and a tablet computing device, as described in the related U.S. patent application Ser. No. 13/353,026. In an example second generation device, sometimes called a brick, the processor of the brick can provide some or all of the logic required to carry out the testing routines, using a tablet as a display for the brick. The technology disclosed can be practiced using either an integrated device with a display or a brick and tablet combination. Using the brick and tablet combination, the expert logic can run either on the brick or the tablet. When running on the brick, the brick can act as a server and the tablet as a client. A browser or app on the tablet can access the server on the brick.

The example integrated Flex device 134 illustrated in FIG. 3A, includes a memory 320 that stores screen files 203 and action files 240. It also includes a processor 330, a touch screen display 340 that renders text and graphics and that can also act as an input device, input interfaces 350, and physical (PHY) interfaces 360. The hardware can also include a special purpose chipset 370, such as the Entropic EN2710 chipset, for signal processing.

Additional components of the example system include a GUI server 205 and a rules and test engine 209 running on the receiver. The GUI server 205 renders text and images defined in the screen files 203 onto the touch screen display 340. The GUI server can accept inputs from the touch screen display. The touch screen display can be divided into different input areas based on definitions stored in the screen files. The hardware can also include input interfaces 350 in the form of physical data entry with key and navigation buttons and physical interfaces 360 for coax, twisted pair, and Wi-Fi interface connections.

A special purpose chipset 370, such as the Entropic EN2710 chipset, can support MoCA, RF, Ethernet and Wi-Fi testing. Wi-Fi protocols supported tree chip set include b, g, n, a, and c networks. The Flex device can be used to solve issues with RF broadcast video tiling, tiling on IPTV, VOD, or DVR; data speeds below SLA, internet connectivity problem and Wi-Fi connectivity problems.

The Flex device 134 includes hardware that can be used to can diagnose video tiling, noise, and faulty wiring and equipment issues. For example, to solve RF broadcast video tiling issues, the Flex supports tests and RF measurements, used to isolate a root cause to faulty wiring, splitter, and/or equipment. Tests used in the expert system can diagnose issues with tiling on IPTV, VOD, or DVR playback by evaluating packet loss on MoCA and Ethernet interfaces to isolate root cause to noise, faulty wiring or faulty equipment. Tests of assess video quality (VMOS) on MoCA and Ethernet interfaces to find issue in home or upstream and view video on the Flex device to isolate faulty TVs in the home. The system can run speed tests on various interfaces such as MoCA and Ethernet to verify upload and download speeds and segment issues on home or upstream networks to resolve issues with data speeds below Service Level Agreements (SLAs). Internet connectivity problems can be solved by the use of a complete suite of embedded IP tests to verify connectivity to various internet sites and determine location of failure. Additionally, Wi-Fi connectivity problems can be solved by scanning Wi-Fi signals and testing specific channel performance to isolate issues to interference, coverage or equipment location, or faulty equipment.

The hardware illustrated in FIGS. 3A and 3B is used by the expert system on the Flex device 134 to test MoCA networks. MoCA networking comprises a physical (PHY) layer, which uses 50 MHz channels located in the spectrum 850-1525 MHz, which can overlap with QAM. These MoCA channels are organized into multiple bands. Only one channel per band is used on a physical network, though multiple MoCA networks can be formed over the same coaxial cable plant using different bands. At the physical layer, MoCA uses a technique called Adaptive Constellation Multi-Tone (ACMT), modeled after Orthogonal Frequency-Division Multiplexing (OFDM), to carry data between nodes. Units of data named ACMT symbols are mapped onto 224 discrete orthogonal sub-carriers that occupy the 50 MHz MoCA channel bandwidth. Each of the sub-carriers is modulated independently using 1-8 bits per symbol (BPSK-256 QAM). The MoCA MAC layer, MoCA QoS, and MoCA Link Privacy layers build upon the MoCA PHY layer. MoCA can be an abstraction layer for the discovery and identification of transport protocols such as Wi-Fi, Ethernet, and HomePlug, which allows the transport protocols to be transmitted over coax, and which also further complicates remediation efforts. The disclosed expert system can measure communication between components, isolate potentially faulty segments of the network, and emulate components of the system to ensure an efficiently functioning MoCA network.

FIG. 4—Expert System Interface

FIGS. 4A-4B illustrate an example GUI interface and message map, respectively, supporting user interaction with a rule-based expert diagnostic system. FIG. 4A includes an example graphic image that can be displayed on a Flex device 134, used by a technician to generically indicate the category of problem being diagnosed, that can indicate which expert system to select. FIG. 4B shows a message map that includes a sequence of messages between an operator and a Flex device 134.

The GUI interface of FIG. 4A can provide access to one or more expert systems that can diagnose electronic video devices, data, and the cabling infrastructure of the in-home network. The display of the Flex device 134 renders images and text. The number of areas and size of each area on the Flex device display is programmable. In one example, a video testing area 403 (button) is defined, and labeled with an image of a video device and/or the text "VIDEO". The video testing area 403 can be tied to a hardware button such as F1 or one can be a touch sensitive on-screen button as an input area in which an operator can touch the display to indicate a selection of video rules and tests. A data testing area 407 can also be defined, and can be used to render an image of a data device that includes the text "DATA". The data testing area 407 can be programmed as an input area in which an operator can touch to indicate a selection of data rules and tests.

FIG. 4B illustrates an example message map between an operator 401, a GUI server 205, and a rules and test engine 209. The GUI server 205 can render images on the display, such as video testing area 403 and data testing area 407. The GUI server 205 can also accept input from operator 401 and, based on that input, invoke the expert systems through the rules and test engine 209. The GUI server 205 can also relay results and instructions from the rules and test engine 209 to the operator 401.

In one example of an expert system message exchange, the operator 401 identifies a problem from an initial screen for video 403 or data 407 diagnostics 423. The expert system for video 403 and data 407 can address video and data problems experienced on a home network. In another implementation, a toolbox 413 can be used to select smaller, discrete tests when the expert system is not needed. And a highly trained field technician can select classic tests 417 to perform discrete tests and view technical result details.

The GUI server 205 accepts input from the operator 401, and prompts the rules and test engine 209 to solve the selected problem or begin the selected test set 427. In one application, the rules and test engine 209 begins analysis of a MoCA network. As the test proceeds, the rules and test engine proceeds based on measurements from or tests performed on the device under test. It can use the GUI server 205 to prompt the operator to enter more data or to perform additional actions as needed 433. The rules and test engine 209 can run a test set 439 that addresses a selected problem or from a selected test regime. It sends instructions to the operator 401 via the GUI server 205, requesting additional information or additional user actions as needed 443. As results from the test set 439 isolate network segments and identify issues within the home network under test, the GUI server 205 can report those results to the operator 453. Unilaterally and automatically, the rules and test engine can chose to run additional test sets until the problem is resolved 467. For example, a Wi-Fi test can be performed by the rules and test engine 209 to solve a user identified problem with a Wi-Fi device that is not working. The Wi-Fi test may, in a first step, find a fault with the Wi-Fi device in a first test set, or may find no fault with the Wi-Fi device and direct a further test setup to isolate a fault in a cable connecting the Wi-Fi device to the home network.

FIG. 5—MRDVR Message Map Example

FIG. 5 illustrates an example of messaging during a Multi-Room Digital Video Recorder (MRDVR) test after operator 401 has selected a video test button 403. The video testing 403 button leads to choices among expert subsystems for diagnosing Video On Demand (VOD), Multi Room Digital Video Recorder (MRDVR), and Live TV. In this section, an expert system controlled MRDVR diagnosis example is described. FIGS. 6A-6G illustrate images presented by a Graphical User Interface (GUI) 205 that are used to lead a technician through isolating network segments using the messaging illustrated in FIG. 5.

FIGS. 5-6 walk through an MRDVR diagnostic sequence, illustrating message exchanges and examples of animations that guide an operator through positioning the Flex to isolate segments of the network. Parts of the example (e.g., FIGS. 6A, B and G) are explained with input files for display screens and screen sequencing. The rules and test engine 209 is capable of performing automated decision making during analysis of an MRDVR issue with minimal human intervention, in communication via a GUI server 205 with an operator 401. FIG. 5 illustrates a testing and messaging sequence directed by the rules and test engine.

An MRDVR test is useful when, for example, a Digital Video Recorder 174 is connected over a MoCA network with at least one Set Top Box (STB) 154 in another room. Problems with playback from the MRDVR can result from faults in the STB, the DVR, the coax cable 115 between them, or any splitters 150, 170 in the coax infrastructure. Some faults, such as a broken coax connector, are easily recognized. Diagnosis of other problems can require expert analysis. Quick and efficient diagnosis is accomplished using the technology disclosed, which automatically sequences test steps without requiring operator analysis of intermediate results.

In this example, an operator 401 selects a Multi Room DVR diagnosis 513 from a GUI. Data indicating this selection is returned to a GUI server 205. The GUI server 205 triggers the MRDVR test 517 to be processed by the rules and test engine 209. The Flex device 134 GUI screens illustrated in FIG. 6A and FIG. 6B are examples of instructions and information to the operator that can be displayed. FIG. 6A illustrates one implementation of a MRDVR test, in which the systems under test are a DVR 604, a STB 602, and the cabling infrastructure between them. Although this example shows one DVR 604 and one STB 602, the MoCA network can contain a plurality of DVR and/or STB devices, all of which can be addressed with the MRDVR test. Each of the primary screens, such as the one shown in FIG. 6A, can have an associated "Tips" screen 608, as illustrated in FIG. 6B. In this example, the operator can access the "Tips" screen by selecting the Back control 606.

Continuing through FIG. 5, the rules and test engine 209 uses a query to determine whether the issue is an isolated MRDVR 527 function, by asking the operator whether the only issue being diagnosed involves DVR recording 523? If the problem is the recording service of the DVR, the Flex device instructs the operator 401 to replace the MRDVR 533, which completes this diagnostic process (subject to restarting diagnosis if the user identifies additional problems). However, if the problem is not with the DVR recording capability, the rules and test engine 209 guides the operator 401 through a controlled segmentation of the MoCA network 100, since a generic MRDVR problem can be traced to the STB, to any segment of infrastructure between the STB and the DVR, or to the DVR itself. When the user indicates that the DVR recording works, testing can begin from a STB 602 in different room from the MRDVR 543. A reusable portion of the MRDVR test sequence, the STB test set 545, causes the Flex device to display graphic instructions (FIGS. 6C-6D) for the operator to connect the Flex device 134 to the STB 553.

FIG. 6C illustrates the beginning of an animation to prepare the STB for the MRDVR test. The graphic instructs the operator to detach the end of the coax cable 614 that connects the STB to a first splitter while identifying the location of the coax connection on the Flex device 612. FIG. 6D illustrates the end of the animation to prepare the STB for the MRDVR test, showing the operator a good connection between the Flex device and the STB. The expert system in the Flex device, particularly the STB test set 559, emulates the DVR offering services to the STB. Once the Flex device has established MRDVR emulation with the STB, a simulated playback is performed. The Flex then prompts the operator to indicate whether an appropriate image appears on a display connected to the STB. If the emulated DVR services to the STB appear correct to the operator, the test advances to the next stage. If the emulated DRV services to the STB do not appear correct to the operator, the Flex instructs the user to connect the Flex device to the STB with a known, good cable, and the test is repeated.

In classic mode or in another test sequence, the Flex can perform MoCA-specific tests of the STB, such as response to remote control button presses that are directed to head end equipment. The tests of the STB also can include effective handling by the STB of image distortion, packet or frame loss, freezing, and jitter.

If the rules and test engine 209 discovers a problem with the STB, it informs the operator 401 of appropriate steps to take to resolve the issue or issues, and the diagnosis is complete. If no problems are found with the STB, the rules and test engine 209 leads the operator 401 through additional steps to prepare for cable segment testing 567. The Flex plays a graphic instruction asking the operator to substitute the Flex device 134 for the STB 563.

Throughout the MRDVR test sequence, the Flex device visually guides the operator in positioning the Flex relative to active and passive components. FIG. 6E illustrates a GUI animation of segmentation for infrastructure testing, starting with using the Flex to replace and emulate STB. In this example, the operator is instructed to detach one end of a coax cable 622 that connects a first splitter to the STB. FIG. 6F shows the Flex device connected to the coax cable 624 that was disconnected from the STB. Animation frames (not shown) can illustrate unfastening the STB connection, rerouting the cable, and making the Flex connection. The rules and test engine 209 can detect that the connection is established or the user can advise that the connection has been made. The rules and test engine 209 begins one or more tests of segments between the Flex device 134 and the MRDVR. It emulates the STB 154 and, in this example, performs a Packet Loss Test (PLT) to the DVR.

A PLT is an example of one of several tests available to the Flex device 134. Versions of this test apply to MoCA, DOCSIS, Wi-Fi, and Ethernet networks. If the PLT test 569 from the STB 154 to the DVR shows no errors 577, after the STB has passed testing, then the problem can be an intermittent problem with the STB, and further testing of the STB can be performed or the STB can be replaced. If the PLT test 569 shows an error, then the segment isolation progresses to the next passive or active component. In this example, the infrastructure connecting the STB and MRDVR consists of passive coax cables and splitters. A wired Ethernet example might include diagnosis of an active wired switch, but the cabling in our MoCA example only includes passive components.

FIG. 6G illustrates part an animation used to direct an operator 573 to replace the infrastructure coax between the Flex device 134 and the first splitter 634 with a good test coax cable 632. Once the good coax cable 632 has been installed, the rules and test engine 209 conducts a PLT test 579 with the replacement coax. The test will show either packets still being lost, or no packets lost 587. If no packets are being lost, then the problem was in the replaced coax cable between the first splitter and the STB, and diagnostics are complete. However, if packets continue to be lost, then the operator is instructed to connect the Flex device 134 bypassing the first splitter 583. Once the first splitter has been bypassed, the rules and test engine 209 repeats the PLT test to determine performance of the bypassed splitter 589.

If the PLT or other test after bypassing splitter 589 shows no errors, then the bypassed splitter is faulty and can be replaced. The diagnostics are complete. However, if the PLT test 589 shows errors, the GUI server 205 instructs the operator 401 to loop back through the process with the next physical segment 593, replacing the next coax segment with the good test coax. Any number of coax and splitter segments can be diagnosed in sequence.

After the operator has tested the passive coax and splitter components between the STB and the DVR, the final test is to connect the Flex device 134 directly to the DVR 174. In some test sequences, a Packet Loss Test can be performed. Or, playback from the MRDVR can be triggered and playback images viewed. In other examples, tests for image distortion, loss, freezing, and jitter, as well as MoCA-specific testing can be performed by the technology disclosed with minimal input from the operator. These tests can be conducted and video quality measured from packet statistics, without viewing of the playback.

While this test sequence is described as tracing from the STB to the MRDVR, of course the testing can run in the other direction, from MRDVR to STB.

Screen File and Action Files

In this section, we describe a GUI technology that supports user interaction and graphical animation playback. The screens and animations represented by FIGS. 6A-G can be defined by one or more screen files 203, and one or more action files 240. Other file formats such as JSON or another tagged or key-value representation can be substituted for XML. These files functionally control what is rendered on the display, and what actions are to be taken based on inputs from the operator or from the physical Flex device ports. The order in which the screens appear on the display is can be thought of as workflow steps. FIG. 6A illustrates an example of a screen entitled SVA0011. FIG. 6B illustrates another example of a screen entitled SVA0012.

FIG. 6A the screen ID is "SVA0011". An example XML file 220 can combine several screen descriptions. The description for SVA011 invokes a graphic file and assigns responses to function keys F1, F3, and F4. The graphic file 230 named "Summary_multiDVR.mp4" is rendered as the image for screen SVA0011.

Example XML form file 220 section for screen SVA0011 follows:

```
<Screen ShortDescription="Indicates equipment and wiring tested for
Multi Room DVR Service" screenType="SummaryRecommendation"
ID="SVA0011">
<UserInteractionScreen>
<Title>SUMMARY</Title>
<Description>
```

Animation showing equipment and wiring tested for Multi Room DVR Service.

```
    </Description>
    <FKeys>
    <F1Key>QUIT</F1Key>
    <F3Key>BACK</F3Key>
    <F4Key>NEXT</F4Key>
    </FKeys>
    <Graphic>Summary_multiDVR.mp4</Graphic>
    </UserInteractionScreen>
    </Screen>
```

A style sheet or other program that parses this XML can be used to produce the display in FIG. 6A.

The corresponding action file 240 segment for screen SVA0011 shows the actions to be taken for the values assigned to the function keys in the display XML file 220. For example, pressing the F4 key with the screen SVA0011 rendered on the display passes the value "NEXT" to the associated action file 240 section, which identifies the action as loading a screen titled UVA0026-000. The example of the action file section follows:

```
<Screen ScreenID="SVA0011-000">
<!-- Indicates equipment and wiring tested for Multi Room DVR Service
-->
<Input Value="QUIT">
<NextScreen ScreenID="FINAL"/>
</Input>
<Input Value="BACK">
<NextScreen ScreenID="SVA0012-000"/>
</Input>
<Input Value="NEXT">
<NextScreen ScreenID="UVA0026-000"/>
</Input>
</Screen>
```

In another example, pressing the F3 key during the display of the screen SVA0011 will cause the value of "BACK" to be passed to the action file 240 as an input value, which is interpreted by the action file as an instruction to load a ScreenID of "SVA0012-000", the tip screen illustrated in FIG. 6B. The display XML file 220 for screen SVA0012 follows:

```
<Screen ShortDescription="Tips screen for Multi Room DVR Summary"
screenType="SummaryRecommendation" ID="SVA0012">
```

```
<UserInteractionScreen>
<Title>TIPS</Title>
<Description>Tips screen for Multi Room DVR Summary</Description>
<ScreenText>
```

\* Multi room DVR test only involves the STB, the DVR, and the coax path between the two \* The router is NOT required for MRDVR to work \* Flex will perform Packet Loss Test between the STB and the DVR

```
</ScreenText>
<FKeys>
<F1Key>QUIT</F1Key>
<F3Key>BACK</F3Key>
<F4Key>NEXT</F4Key>
</FKeys>
</UserInteractionScreen>
</Screen>
```

In this example, the tip text 608 is displayed. Nothing will occur if the operator presses F2, as there are no values associated with that button in the display XML file 220 section for SVA0011, or in the action file 240 below. If the operator presses F1 or F3 for values "QUIT" or "BACK" respectively, the action file performs a "FINAL" action that concludes diagnostics, and returns the operator to an initial screen. If the operator presses the F4 button, then the value "NEXT" is passed from the screen SVA0012 to the action file SVA0012-000", and the action file 240 causes the GUI server 205 to render the screen "SVA0011-000", thereby returning to the previous screen. Action file 240 section associated with screen "SVA0012" follows:

```
<Screen ScreenID="SVA0012-000">
<!-- Tips screen for Multi Room DVR Summary -->
<Input Value="QUIT">
<NextScreen ScreenID="FINAL"/>
</Input>
<Input Value="BACK">
<NextScreen ScreenID="FINAL"/>
</Input>
<Input Value="NEXT">
<NextScreen ScreenID="SVA0011-000"/>
</Input>
</Screen>
```

As outlined above, the user can press the F4 button during a display of a ScreenID "SVA0011", which passes the value "NEXT" to its action file 240 section. The action file then invokes the ScreenID "UVA0026-000", which has the following definition within the XML file 220:

```
<Screen ShortDescription="Video Pixelates at DVR or at STB" screenType="UserInteraction" ID="UVA0026">
<UserInteractionScreen>
<Title>Select where Video Pixelates</Title>
<Description>Video Pixelates at DVR or at STB</Description>
<ScreenText>Select where Video Pixelates</ScreenText>
<FKeys>
<F1Key>QUIT</F1Key>
<F3Key>BACK</F3Key>
</FKeys>
<SelectableGraphics>
<Graphic Value="PIXELATION_DVR" Label="Recording Issue at DVR" graphicFile="pix_DVR.png"/>
<Graphic Value="PIXELATION_NON_DVR" Label="Recording Issue only at Remote STB" graphicFile="pix_not_DVR.png"/>
</SelectableGraphics>
</UserInteractionScreen>
</Screen>
```

In this example, the operator is offered a choice of selecting a pixelation issue with a DVR, or a pixelation issue with a STB. This is just one example of a plurality of options that can be made available to an operator.

As the operator identifies the options for test selection, the expert system invokes a plurality of reusable procedures. These procedures can be illustrated by a directed graph, of which one example is shown in FIG. 7A.

FIGS. 7A and 7B—Rule-Based Expert Systems and Directed Graphs

The expert systems embedded within the Flex device 134 can be represented as an ordered or directed graph, which is illustrated in FIG. 7A, represented as a set of rules, which is illustrated in FIG. 7B, or in a combination of rules and graphs. The directed graph is a set of connected vertices, includes edges that are directed from one vertex to another. In one implementation, an Integrated Development Environment (IDE) can be used to create and edit a directed graph, which clearly identifies the possible flows based on conditions specified within the directed graph. The directed graph can then be processed into rule tables for a rule based expert system inference engine by traversing the directed graph of FIG. 7A into an equivalent rules table as illustrated in FIG. 7B. FIG. 7B is a partial example of a rule table generated by a directed graph. A more completed rule table would include branching instructions. For example, node TTA0002-0 727A has one outcome of "Pass", and another outcome of "Fail". A more complete rule table FIG. 7B could contain two additional columns; one which identified branching instructions for a first outcome, and one that identified branching instructions for a second outcome if one existed. For the sake of brevity, FIG. 7B outlines only those outcomes necessary to illustrate the technology disclosed, and the processing order is from top to bottom of the rule table.

In this example, the nodes of the directed graph are named per a naming convention with 7 characters, in which the first 3 characters are alphabetic and the remaining 4 characters are numeric. The naming convention also allows for a suffix, which is used to identify the instance of a set of shapes that constitute a reusable code segment.

In the example shown in FIG. 7A, the first character can be a "T", "R", "S", or "U":

T—Test
R—Recommendation
S—Summary
U—User Input

The second character can be a "V", "D", or "T":

V—Video
D—Data
T—Toolbox

The third character can be a "W", "M", "R", "E", or "A":

W—Wi-Fi
M—MoCA
R—RF
E—Ethernet
A—All or more than one of the above

In this example, a node named UVM0001 701*a* indicates a screen file for a User Input, Video, and MoCA screen. A node indicating a user interface, such as UVM0001, can have entries in both a screen file and an action file. The remaining 4 digits of the 7 character name can be used to ensure unique labeling. For example, a screen file, represented in display XML file 220, can include an entry, listed below, for UVM0001 701*a*, which contains an animation showing how to replace a device for diagnostic purposes with the Flex device 134.

```
<Screen ShortDescription="Animation showing Replace Device Under
test with Flex"
screenType="UserInteraction" ID="UVM0001">
<UserInteractionScreen>
<Title>Flex to BHR eth</Title>
<Description>
```

Animation Showing Replace Device Under Test with Flex

```
</Description>
<ScreenText>Connect Flex as shown then click "NEXT" to
proceed</ScreenText>
<FKeys>
<F1Key>QUIT</F1Key>
<F2Key>ACTION</F2Key>
<F3Key>BACK</F3Key>
<F4Key>NEXT</F4Key>
</FKeys>
<Graphic>LiveTv_B2.mp4</Graphic>
</UserInteractionScreen>
</Screen>
```

Action file 240 can include an entry, listed below, for UVM0001 701*a* which contains the actions to be taken, based on the user's entry to the user interface. In this example node, UVM0001 701*a* in the directed graph is equivalent to rule UVM0001 701*b* in the rule table.

```
<Screen ScreenID="UVM0001-000">
<!-- Animation showing Replace Device Under test with Flex -->
<Input Value="QUIT">
<NextScreen ScreenID="FINAL"/>
</Input>
<Input Value="ACTION">
<NextScreen ScreenID="UVA0027-001"/>
</Input>
<Input Value="BACK">
<NextScreen ScreenID="UVA0027-001"/>
</Input>
<Input Value="NEXT">
<NextScreen ScreenID="UVA0034-000"/>
</Input>
</Screen>
```

As an illustration, the next code segment shows the value "NEXT" being passed from the screen file to the action file, which sets the FixedValue value to to "N1" for the VariableName equal to "Instance" in step UVA0034 731*a/b*. That is, the screen file entry for UVA0034 731*a/b* is used to set the instance variable and no information is presented on the display.

```
<Screen ShortDescription="Sets Instance variable to 1"
screenType="UserInteraction" ID="UVA0034">
<VariableMapScreen>
<FixedToVariable FixedValue="N1" VariableName="INSTANCE"/>
</VariableMapScreen>
</Screen>
```

In this example, setting the FixedValue variable to "N1" informs subsequent nodes of reusable code of the identity of the calling node. This allows the nodes of reusable code to perform as a subroutine call, with a return location, in a script without a subroutine structure.

Action file 240 also includes an entry for UVA0034 731*a/b* that passes control to a node named TTA0000 725*a/b*.

```
<Screen ScreenID="UVA0034-000">
<!-- Sets Instance variable to 1 -->
<Input Value="NEXT">
<NextScreen ScreenID="TTA0000-000"/>
</Input>
</Screen>
```

Next, we describe an example cleanup node, which can be used to clean up memory and variables within the Flex device 134. The node named TTA0000, which is a test node from the toolbox used for all tests, is used to clean up memory and variables as an initial step for a new test, and as a final step for any failed test components. For example, TTA0000-0 725*a/b* is used to initially cleanup for node TTA0002 725*a/b*, while TTA0000-003 745*a/b* is used to cleanup if errors are encountered with nodes such as TTA0002 727*a/b*, TTM0001 747*a/b*, TTA021 767*a/b*, or TTM0005 776*a/b*. The instance of TTA0000-000 725*a/b* calls the screen file entry for TTA0002-000 727*a/b*, which enables the MoCA hardware on the Flex device 134.

```
<Screen ShortDescription="Enables MoCA Module"
screenType="Active" ID="TTA0002">
<ActiveTestScreen>
<Title>Enabling MoCA</Title>
<Description>Enables MoCA module</Description>
<FKeys/>
<EnableHardware>
<hardware-component>MOCA</hardware-component>
</EnableHardware>
</ActiveTestScreen>
</Screen>
```

Once initial cleanup is complete, the next step in the test sequence activates the MoCA hardware in the Flex device 134. The action file entry for TTA0002-000 727*a/b* addresses a successful activation of the MoCA hardware by passing control to TTM0001 747*a/b*, and addresses a failure to activate the MoCA hardware by passing control to TTA0000-003 745*a/b*.

```
<Screen ScreenID="TTA0002-000">
<!-- Enables MoCA Module -->
<Input Value="PASS">
<NextScreen ScreenID="TTM0001-000"/>
</Input>
<Input Value="FAIL">
<NextScreen ScreenID="TTA0000-003"/>
</Input>
</Screen>
```

TTM0001 747*a/b* passes control to TTA0021 767*a/b* so that the Flex device 134*a/b* can acquire a DHCP address, as if it was a STB. Node TTA0021 767*a/b* then passes control to node UVA0010 759*a/b*, When the test modules that comprise UVA0010 759*a/b* have run to completion with no failures, the AutoRoutineCompleted variable is set. If a module within the routines called by UVA0010 759*a/b* indicates that the Flex device 134 needs an update to a screen file, an action file, or device firmware, then node TTA0012 779*a/b* is activated. A failure of an update to a screen file, action file, or firmware does not signal the system to stop processing. Once testing is complete, in order to change the IP filter to the DVR IP address, UVA0010 759a/b passes control to node TTA0030 788a/b, which in turn obtains all other IP addresses on the current subnet by passing control to TTM0005 776a/b. Node TTM0005 776a/b then passes control to additional nodes that perform additional tests on the subnet.

FIG. 8—Data Speed Message Map Example

FIG. 8, like FIG. 5, illustrates an example of messaging during a test. This test looks for bottle necks in access speed to the Internet from devices connected through the Broadband Home Router (BHR) via various physical layers. The Flex can be positioned in place of a STB, home computer, laptop or other device that accesses the Internet. Once speedy access to the Internet from the BHR position is confirmed, bottlenecks within the home can be analyzed.

Data issues can occur in MoCA, DOCSIS, Ethernet or Wi-Fi home networks, and can include connectivity, speed, or partial data loss issues. In one implementation, a speed test can be useful in discovering the location of a fault within a network, including a Local Area Network (LAN) and a Wide Area Network (WAN). In some cases, such as with a broken connector or a dead device, the problem is obvious. However, some problems required an expert understanding of the intricacies of a data network.

In one implementation, an operator 401 selects DATA diagnosis 803 from a GUI server 205, as illustrated in 407 of FIG. 4A. The GUI server invokes the DATA test 809 to be processed by the rules and test engine 209. In this example, the data test uses a speed test as a first step in analysis of the home network. The speed test can identify if network connectivity is available. The speed test can also be used by the rules and test engine 209 to analyze the quality of the network connection. The operator 401 is instructed to connect the Flex device 134 to a BHR 120 LAN port with a known good Ethernet cable 813. This will isolate the issue to the BHR 817. The rules and test engine 209 then runs a speed test 819, which first validates that a connection to the Internet is available, and second validates that a good connection works at an expected speed 828. The expert system recognizes that the first step in the data test sequence is to validate the WAN connectivity.

If the connection to the Internet through the BHR LAN port is not available, or the quality of the connection is not as expected, the problem can be the BHR. The rules and test engine 209 can instruct the operator 401 to replace the BHR with the Flex device 823, which then simulates the actions of the BHR. If the connection is still not available, or the quality of the connection is still not as expected, the rules and test engine 209 will send a message to the operator 401 through the GUI server 205 to report a bad WAN connection, and the diagnostic is complete. However, if the connection to the Internet by the Flex device performs as expected, the operator is instructed to replace the old BHR with a new BHR and retest.

If the connection to the Internet through the BHR LAN performs as expected, the rules and test engine can send a message to the operator to select an additional test 833. In this example, an additional test can include a Wi-Fi test 859, an Ethernet test 869, a DOCSIS test 879, or a MoCA test 889.

A Wi-Fi test can include a Wi-Fi service embedded in the BHR, or a Wi-Fi service provided by a device such as a Wireless Access Point (WAP) that is connect to the BHR by coax or Ethernet cable. If the operator selects a Wi-Fi test for a Wi-Fi service embedded in the BHR, the operator 401 is instructed by the rules and test engine 209 to stand 6 feet from the BHR in a direct line of site 853, with the Flex coax connector pointed at the router. The rules and test engine 209 then connects to the Wi-Fi service within the BHR using information such as SSID and password supplied by the operator, then invokes a speed test 859. If the speed test finds that the Wi-Fi service in the BHR is performing as expected, the summary results of the speed test are sent to the operator 401, and the diagnostic is complete. The operator can also be instructed to move the BHR to a location where the Wi-Fi service offered by the BHR is closer to the devices using the Wi-Fi service. If the speed test finds that the Wi-Fi service in the BHR is not performing as expected, the operator is instructed to replace the BHR with a new BHR and retest.

If the operator selects a Wi-Fi test for a Wi-Fi service provided by in a WAP, the operator 401 is instructed by the rules and test engine 209 to stand 6 feet from the WAP in a direct line of site, with the Flex coax connector pointed at the WAP. The rules and test engine 209 then connects to the Wi-Fi service within the WAP using information such as SSID and password supplied by the operator, then invokes a speed test 859. If the speed test finds that the Wi-Fi service in the WAP is performing as expected, the summary results of the speed test are sent to the operator 401, and the diagnostic is complete. The operator can also be instructed to move the WAP to a location where the Wi-Fi service offered by the WAP is closer to the devices using the Wi-Fi service. If the speed test finds that the Wi-Fi service in the WAP is not performing as expected, the operator is instructed to replace the WAP with the Flex device and retest.

WAP devices can be connected to the LAN with cable such as coax or Ethernet. If the cabling is coax, the infrastructure between the WAP under test and the BHR can have zero or more bridges, one or more segments of coax, and zero or more splitters. For each segment of coax, and for each splitter, segmentation can occur wherein the infrastructure is tested for each segment moving from the WAP to the BHR. If the cabling is Ethernet, the infrastructure between the WAP under test and the BHR can have one or more segments of Ethernet cabling, and zero or more switches or hubs. For example, in FIG. 1, the WAP 130 is connected to the BHR 120 by one segment of Ethernet cable. In this example, the Wi-Fi speed test 859 would have only one segment to test after the WAP 130.

If the operator selects a data Ethernet test 863 for an Ethernet device such as a game console 162, the rules and test engine 209 would instruct the operator to substitute the Flex device 134 for the game console 162, and test each segment between the game console and the BHR, alternating between Ethernet cable, a MoCA bridge 160, coax 115, and splitters 150, 110.

If the operator selects a DOCSIS test 879, the operator is instructed to prepare for a DOCSIS test 873 and a segmentation equivalent to the Wi-Fi speed test 859 is invoked by the rules and test engine 209.

If the operator selects a MoCA test 889, the operator is instructed to prepare for a MoCA test 883 and a segmentation equivalent to the Wi-Fi speed test 859 is invoked by the rules and test engine 209.

Example Active and Passive Tests Invoked by Expert System

The following list of tests and other implementations of the technology disclosed can include one or more of the following tests or test features and/or tests or test features described in connection with additional tests disclosed. In the interest of conciseness, the combinations of tests disclosed in this application are not individually enumerated and are not repeated with each base set of tests or test features. The reader will understand how tests or test features identified in this section can readily be combined with sets of base tests or test features identified as implementations impacting details of test implementation and analysis and of setting thresholds based on test results.

Each of the active and passive tests below, as components of expert system tests such as Video On Demand, MRDRV, Live TV, and Data. These tests can be incorporated and can be executed on the PHY interfaces 360 identified in FIG. 3.

Active Tests

TST-BURST

Provides a network quality test with bursty traffic, possibly useful to evaluate a traffic policing and traffic shaping framework.

TST-ECHO

Provides an overall snapshot of basic network health, measuring important characteristics such as jitter, latency, and loss. It is useful for verifying SLA compliance and in determining network integrity for VoIP and other real-time protocols that are heavily affected by these parameters.

TST-ETHDM-Y1731

For Y.1731-enabled networks, provides an Ethernet-layer tool focused on frame delay measurements between the unit and a known endpoint. This type of OAM testing is sometimes referred to as "ETH-DM"

TST-LINKTRACE-xx

Provides a layer 2 (MAC/Ethernet) tracing tool for reporting the hops a test frame traverses from source to destination, compliant with a subset of either IEEE 802.1ag or ITU-T Y.1731. It can serve as an important tool for determining the topology of a LAN service, especially for services that involved multiple bridged LANs to complete the end-to-end path.

TST-LPBK-xx

Provides a tool for fault verification and isolation, as well as measurement of important network characteristics such as latency and loss. The test operates at the Ethernet layer on an 802.1ag and Y.1731-enabled networks, where loopback request frames are sent to a target NE (MEP/MIP), which should then return the frames to the unit for analysis. This type of OAM testing is sometimes referred to as "ETH-LB".

TST-MLPBK-Y1731

Performs a multicast loopback to identify MEPs on the service. The test operates at the Ethernet layer, where a multicast loopback request frame is transmitted into the network and then returned to the originator by all available MEPs.

TST-PING

Verifies that a specified IP destination (endpoint) can be reached, as a basic test of network-level connectivity. The destination device must support ICMP ping.

TST-RFC2544

Run a group of tests originally designed to benchmark the performance characteristics of a network interconnecting device, adapted to refer to overall service or link performance.

TST-THRUPUT

Determines the maximum data rate that can be sent between the unit and a remote echo server, up to the CIR specified when the test session was established. This test is most useful when testing data services rather than real-time transport such as VoIP or video. For this reason, the test is best suited for evaluating data flow performance for processes such as file transfers and web page traffic. This test can be used as a speed test, as it measures throughput.

TST-TRACERT

Provides a standard ICMP over UDP traceroute function that runs three concurrent traceroute processes and reports every router "hop" along the path. The results provide a topological view of the route that packets are using to reach the destination.

TST-TWAMP

Initiates and manages a Two-Way Active Measurement Protocol (TWAMP) client session to analyze and report metrics such as network jitter, latency, and loss.

Passive Tests

MON-ETH-CAPTURE

Launches a capture of Ethernet frames according to any filter and/or capture settings provided. Following the capture, a capture file is generated that can be transported off the unit for external analysis.

MON-ETH-CONN

Tracks and reports the conversation statistics between either pairs of Ethernet MAC addresses or pairs of IP addresses, including the number of bytes and frames being transmitted in each direction of the conversation.

MON-ETH-FRMSIZE

Provides a comparative view of the size of Ethernet frames flowing through the service. Results are presented as comparative frame counts and percentages of total frame count.

MON-ETH-PRTDIST

Reports on IP packet distribution based on TCP/IP link, internet, and transport-level protocols, such as OSPF, and TCP, or application-level protocols such as HTTP and SNMP. It provides a comparative view of network usage according to logical protocols.

MON-ETH-PTY

Provides a high-level view of traffic on the link sorted by VLANs and VLAN priorities, or VLANs and DSCP (class of service/CoS) values, as detected within Ethernet frame and IP packet headers, as applicable.

MON-ETH-TOPU

Reports the top users of the network based on bandwidth consumption. Depending on the test setup, a "user" can be a device sending traffic or an application protocol in use on the network. This information provides a high-level view of the primary users of the network and what the network is being used for.

MON-ETH-VLAN

Provides comprehensive layer 2 statistics on the link sorted by VLAN, as detected within Ethernet frame headers. It includes overall data measurements such as frame and data counts, link utilization, frame sizes, and a variety of other information.

Particular Implementations

In one implementation, a device is described that will often be operated by a cable network dispatched service person. This device can be used to diagnose faults in a multimedia over coax alliance (MoCA) local area network (LAN) coupled to a wide area network (WAN). The device includes test hardware that implements MoCA protocols coupled to at least one coaxial fitting and a processor coupled to the test hardware and to a tangible computer readable storage medium storing computer instructions. The computer instructions, when executed, cause the processor to perform an expert system method. Responsive to selection of a test sequence, the expert system method including repeatedly causing display of multiple instructional images, invoking the test hardware to perform a test, automatically evaluating results returned by the test hardware, and either reporting a result or initiating an additional test. Often, the operator will select the test sequence. At least two test sequences for diagnosing multi room DVR's and for data speed access to the WAN are described and illustrated above. On this device, the multiple instructional images depict how an operator manually couples the test hardware in connection with MoCA components of the LAN in a position that isolates a portion of the LAN for evaluation. The multiple instructional images can be animated.

Invoking the test hardware, includes selecting a test to perform from the test sequence, without intervening user selection of the test from the test sequence. In the examples above, multiple tests or test steps are included in a test sequence. The sequence of tests is designed to Ron without user selection of individual test in the test sequence. Running the test from the test sequence invokes the test hardware with parameters that control interaction with the MoCA components, for MoCA-related tests.

Evaluating results returned by the test hardware, includes using evaluation criteria of the test sequence, without user interpretation of the results returned, to determine whether to report a recommendation to replace or repair an identified component. Having the device evaluate results returned by the test hardware relieves the operator of the need to understand technical details of test protocols and of the need to understand acceptable and unacceptable test results. It also relieves the operator of the need to choose the next test to perform in a test sequence. Alternatively, the device can determine to repeat the cycle above, including the causing display of multiple instructional images and, for an additional physical location in the LAN, the invoking the test hardware to perform an additional test, and the automatically evaluating results returned by the additional test.

In the course the test sequence, the device can instruct an operator to move the device from one physical location in the LAN to another, isolating segments to evaluate. Both active and passive elements of the LAN can be evaluated.

In one implementation, the device proceeds as determined and makes a report or repeats the cycle described above to perform an additional test in the test sequence. The report can be to the operator on a display.

This device and other implementations of the technology disclosed can include one or more of the following features and/or features described in connection with additional implementations disclosed. In the interest of conciseness, the potential combinations of features disclosed in this application are not individually enumerated and are not repeated with each base set of features. The reader will understand how features identified in this section can readily be combined with the sets of these features identified for other implementations such as Wi-Fi testing or generally for testing a local area network.

The test sequence operating on the device can include at least one test or step that tests connection of the LAN to the WAN. In this LAN-to-WAN test, the multiple instructional images depict how an operator manually couples the test hardware in connection with the WAN in a position that isolates the LAN from the WAN for evaluation. Invoking the test hardware involves the device automatically selecting a test to perform from the test sequence, without intervening user selection of the test from the test sequence, and invoking the test hardware with parameters that control interaction with the WAN. The evaluation of results returned by the test hardware involves using evaluation criteria of the test sequence, without user interpretation of the results returned, to determine whether to report an evaluation of the WAN link.

The test hardware and/or computer instructions can further implement emulation of a variety of active devices on the MoCA LAN. Devices emulated include one or more of a basic home router, a set top box, and a digital video recorder. It also can include a MoCA to Ethernet adapter or a MoCA to Wi-Fi adapter. We refer to the test hardware and/or computer instructions because there is not going migration from hardware and firmware implemented technologies to software defined technologies running on hardware. For instance, software defined radios and software defined networks are now available. This term is not meant to include software per se, for US patent purposes.

In another feature, the device can test a Wi-Fi link on the LAN. In this context, link means a wireless connection between two antennas. Typically, this link is broadcast on particular channel using a particular SSID. The user may be asked to select the SSID of the link to test. This feature can include test hardware that implements WiFi protocols and is coupled to an antenna.

This feature includes computer instructions that implement at least one pair of WiFi steps in the test sequence tests a WiFi link on the LAN, and that pair of WiFi steps optionally includes user selection of a particular WiFi link to test. A pair of steps test the Wi-Fi link in both directions. For the pair of WiFi steps, the elements described above are applied to Wi-Fi instead of MoCA. The multiple instructional images depict how an operator manually couples the test hardware in connection with a wired component and a wireless component of the LAN in a position that isolates a portion of the LAN for evaluation. Invoking the test hardware includes selecting a test (or pair of tests) to perform from the test sequence, without intervening user selection of the test from the test sequence. Performing the test invokes the test hardware with parameters that control interaction with the wireless component. Evaluating results returned by the test hardware includes using evaluation criteria of the test sequence, without user interpretation of the results returned, to determine whether to report an evaluation of the WiFi link. A detailed evaluation of the Wi-Fi link may be reserved for a failed test. Evaluation may include recommended remediation steps.

As above, the test hardware and/or computer instructions can further implement emulation of a variety of active devices on the MoCA LAN.

Test hardware can provide RF capabilities and implement a monitor mode access to MoCA hardware for packet and signal statistics. The device configured to provide protocol level access to MoCA commands for network survey. Passive components of the MoCA network can include coaxial cable and splitters. The test hardware can rapidly sequence multiple tests, more quickly than if an operator were selecting, starting in evaluating the tests. The test device described can be embedded in another device, such as a general-purpose network analyzer. Tests performed using the device can include a packet loss test, an RF single channel test, a Wi-Fi quick test, and a speed test. The device can be configured to identify passive network components, for instance, by reflectometry.

The technology disclosed also can be described as a method of diagnosing faults in a multimedia over coax alliance (MoCA) local area network (LAN) coupled to a wide area network (WAN). The method implementation generally follows the outline of actions carried out by the device described above. These actions necessarily are performed on digital hardware, such as test hardware and processors. In a method implementation, running on a processor, responsive to selection of a test sequence, the method running include a processor, including repeatedly causing display of multiple instructional images, invoking test hardware to perform a test, automatically evaluating results returned by the test hardware, and either reporting a result or initiating an additional test. The method, actions are generally as described above.

The multiple instructional images depict how an operator manually couples the test hardware in connection with MoCA components of the LAN in a position that isolates a portion of the LAN for evaluation.

Invoking the test hardware involves selecting a test to perform from the test sequence, without intervening user selection of the test from the test sequence, and invokes the test hardware with parameters that control interaction with the MoCA components.

Evaluating results returned by the test hardware uses evaluation criteria of the test sequence, without user interpretation of the results returned, to determine whether to report a recommendation to replace or repair an identified component, or to repeat the causing display of multiple instructional images and, for an additional physical location in the LAN, the invoking the test hardware to perform an additional test, and the automatically evaluating results returned by the additional test.

Some implementations include proceeding as determined with the report or the repeat.

Features of the method can include most or all of the features of the device implementation described above and additional features described throughout this disclosure. For the sake of brevity, we forgo repeating those features and instead incorporate them by reference.

The technology disclosed also can be practiced as a tangible computer readable media impressed with computer instructions that, when executed on a processor, cause the processor and the test hardware to carry out the method described above for, when combined with appropriate hardware and processor, produce the device described above. Again, features implemented using the tangible computer readable media can include most or all of the features of the device implementation described above and additional features described throughout this disclosure.

In jurisdictions outside the United States, the technology disclosed also can be practiced as software per se or as computer instructions carried by electromagnetic transmission. For claim purposes, tangible computer readable media is not intended to extend to software per se or computer instructions carried by electromagnetic transmission without a tangible media that persists the computer instructions well beyond signal transit time.

The technology disclosed also can implement a device to diagnose faults in a multimedia over at least one WiFi segment of a local area network (LAN) coupled to a wide area network (WAN). In this implementation, the test hardware implements WiFi and LAN protocols, and is coupled to a wired connector and to an antenna. This device further includes a processor coupled to the test hardware and to a tangible computer readable storage medium storing computer instructions, the computer instructions that cause the processor to perform an expert system method, responsive to selection of a test sequence, the expert system method including repeatedly causing display of multiple instructional images, invoking the test hardware to perform a test, automatically evaluating results returned by the test hardware, and either reporting a result or initiating an additional test. The actions applied above to testing MoCA segments of a LAN are adapted in this implementation to testing Wi-Fi segments. In this implementation, at least one pair of WiFi steps in the test sequence tests a WiFi link on the LAN, and that pair of WiFi steps optionally includes user selection of a particular WiFi link to test.

The multiple instructional images depict how an operator manually couples the test hardware in connection with a wired component and, for at least a pair of tests, also to a wireless component of the LAN in a position that isolates a portion of the LAN for evaluation.

Invoking the test hardware, selects a test to perform from the test sequence, without intervening user selection of the test from the test sequence, and invokes the test hardware with parameters that control interaction with the LAN components.

Evaluating results returned by the test hardware, uses evaluation criteria of the test sequence, without user interpretation of the results returned, to determine whether to report a recommendation to replace or repair an identified component, or to repeat the causing display of multiple instructional images and, for an additional physical location in the LAN, the invoking the test hardware to perform an additional test, and the automatically evaluating results returned by the additional test.

Some implementations further include proceeding as determined with the report or the repeat.

Features of the Wi-Fi testing implementation can include most or all of the features of the MoCA testing implementation described above and additional features described throughout this disclosure. For the sake of brevity, we forgo repeating those features and instead incorporate them by reference.

The Wi-Fi testing implementation most of be practiced as a method or as a tangible computer readable media impressed with computer instructions. The computer instructions and either, when executed, implement any of the methods described, for when combined with suitable hardware and processor, produce any devices described. Once again, the features described above can be combined with the Wi-Fi testing implementation. For the sake of brevity, the features are incorporated by reference, instead of being repeated.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A device to diagnose faults in a multimedia over coax alliance (MoCA) local area network (LAN) coupled to a wide area network (WAN) comprising:
   test hardware that implements MoCA protocols coupled to at least one coaxial fitting;
   a processor coupled in communication with the test hardware and to a tangible computer readable storage medium storing computer instructions, the computer instructions that cause the processor to perform an expert system method, responsive to selection of a test sequence, the expert system method including repeatedly causing display of multiple instructional images, invoking the test hardware to perform a test, automatically evaluating results returned by the test hardware, and either reporting a result or initiating an additional test, wherein:
the multiple instructional images depict how an operator manually couples the test hardware in connection with MoCA components of the LAN in a position that isolates a portion of the LAN for evaluation;
the invoking the test hardware, automatically selects, in dependence upon a problem generically identified by a user, a test to perform from the test sequence, without intervening user selection of the test from the test sequence, and invokes the test hardware with parameters that control interaction with the MoCA components;
the evaluating results returned by the test hardware, uses evaluation criteria of the test sequence, without user interpretation of the results returned and in dependence upon a threshold associated with the evaluation criteria, to determine at least one of (i) whether to report a recommendation to replace or repair an identified component, and (ii) whether to repeat the causing display of multiple instructional images and, for an additional physical location in the LAN, the invoking the test hardware to perform an additional test, and the automatically evaluating results returned by the additional test;
proceeding as determined with the report or the repeat; and
the test sequence includes at least one step that tests connection of the LAN to the WAN, as a LAN-to-WAN test, the LAN-to-WAN test including:
the multiple instructional images depicting how an operator manually couples the test hardware in connection with the WAN in a position that isolates the LAN from the WAN for evaluation;
the invoking the test hardware, selecting a test to perform from the test sequence, without intervening user selection of the test from the test sequence, and invoking the test hardware with parameters that control interaction with the WAN; and
the evaluating results returned by the test hardware, using evaluation criteria of the test sequence, without user interpretation of the results returned, to determine whether to report an evaluation of connection to the WAN.

2. The device of claim 1, causing display of the multiple instructional images as an animation.

3. The device of claim 1, wherein at least one of the test hardware and the computer instructions further implement emulation of a basic home router of the MoCA LAN.

4. The device of claim 3, wherein at least one of the test hardware and the computer instructions further implement emulation of a set top box of the MoCA LAN.

5. The device of claim 4, wherein at least one of the test hardware and the computer instructions further implement emulation of a digital video recorder of the MoCA LAN.

6. The device of claim 1, further including:
the test hardware implements WiFi protocols and is coupled to an antenna;
the computer instructions implement at least one pair of WiFi steps in the test sequence, tests a WiFi link on the LAN, and that pair of WiFi steps optionally includes user selection of a particular WiFi link to test;
for the pair of WiFi steps:
the multiple instructional images depict how an operator manually couples the test hardware in connection with a wired component and a wireless component of the LAN in a position that isolates a portion of the LAN for evaluation;
the invoking the test hardware, selects a test to perform from the test sequence, without intervening user selection of the test from the test sequence, and invokes the test hardware with parameters that control interaction with the wireless component; and
the evaluating results returned by the test hardware, uses evaluation criteria of the test sequence, without user interpretation of the results returned, to determine whether to report an evaluation of the WiFi link.

7. The device of claim 6, wherein at least one of the test hardware and the computer instructions further implement emulation of an access point on the LAN.

8. A method of diagnosing faults in a multimedia over coax alliance (MoCA) local area network (LAN) coupled to a wide area network (WAN) comprising:
responsive to selection of a test sequence, the method running on a processor, including repeatedly causing display of multiple instructional images, invoking test hardware to perform a test, automatically evaluating results returned by the test hardware, and either reporting a result or initiating an additional test, wherein:
the multiple instructional images depict how an operator manually couples the test hardware in connection with MoCA components of the LAN in a position that isolates a portion of the LAN for evaluation;
the invoking the test hardware, automatically selects, in dependence upon a problem generically identified by a user, a test to perform from the test sequence, without intervening user selection of the test from the test sequence, and invokes the test hardware with parameters that control interaction with the MoCA components;
the evaluating results returned by the test hardware, uses evaluation criteria of the test sequence, without user interpretation of the results returned and in dependence upon a threshold associated with the evaluation criteria, to determine at least one of (i) whether to report a recommendation to replace or repair an identified component, and (ii) whether to repeat the causing display of multiple instructional images and, for an additional physical location in the LAN, the invoking the test hardware to perform an additional test, and the automatically evaluating results returned by the additional test;
proceeding as determined with the report or the repeat; and
the test sequence includes at least one step that tests connection of the LAN to the WAN, as a LAN-to-WAN test, the LAN-to-WAN test including:
the multiple instructional images depicting how an operator manually couples the test hardware in connection with the WAN in a position that isolates the LAN from the WAN for evaluation;
the invoking the test hardware, selecting a test to perform from the test sequence, without intervening user selection of the test from the test sequence, and invoking the test hardware with parameters that control interaction with the WAN; and
the evaluating results returned by the test hardware, using evaluation criteria of the test sequence, without user interpretation of the results returned, to determine whether to report an evaluation of connection to the WAN.

9. The method of claim 8, further including causing display of the multiple instructional images as an animation.

10. The method of claim 8, further including emulation of a basic home router of the MoCA LAN.

11. The method of claim 10, further including emulation of a set top box of the MoCA LAN.

12. The method of claim 11, further including emulation of a digital video recorder of the MoCA LAN.

13. A tangible computer readable media impressed with computer instructions that, when executed on a processor, cause the processor and the test hardware to carry out the method of claim 8.

14. A tangible computer readable media impressed with computer instructions that, when executed on a processor, cause the processor and the test hardware to carry out the method of claim 8 and further carry out emulation of a basic home router of the MoCA LAN.

15. A tangible computer readable media impressed with computer instructions that, when executed on a processor, cause the processor and the test hardware to carry out the method of claim 8 and further carry out emulation of a basic home router and of a set top box of the MoCA LAN.

16. A tangible computer readable media impressed with computer instructions that, when executed on a processor, cause the processor and the test hardware to carry out the method of claim 8 and further carry out emulation of a basic home router, of a set top box and a digital video recorder of the MoCA LAN.

17. A device to diagnose faults in a multimedia over at least one WiFi segment of a local area network (LAN) coupled to a wide area network (WAN) comprising:
  test hardware that implements WiFi and LAN protocols, the test hardware coupled to a wired connector and to an antenna;
  a processor coupled to the test hardware and to a tangible computer readable storage medium storing computer instructions, the computer instructions that cause the processor to perform an expert system method, responsive to selection of a test sequence, the expert system method including repeatedly causing display of multiple instructional images, invoking the test hardware to perform a test, automatically evaluating results returned by the test hardware, and either reporting a result or initiating an additional test, wherein:
    at least one pair of WiFi steps in the test sequence, tests a WiFi link on the LAN, and that pair of WiFi steps optionally includes user selection of a particular WiFi link to test;
    the multiple instructional images depict how an operator manually couples the test hardware in connection with a wired component and, for at least a pair of tests, also to a wireless component of the LAN in a position that isolates a portion of the LAN for evaluation;
    the invoking the test hardware, automatically selects, in dependence upon a problem generically identified by a user, a test to perform from the test sequence, without intervening user selection of the test from the test sequence, and invokes the test hardware with parameters that control interaction with the LAN components;
    the evaluating results returned by the test hardware, uses evaluation criteria of the test sequence, without user interpretation of the results returned and in dependence upon a threshold associated with the evaluation criteria, to determine at least one of (i) whether to report a recommendation to replace or repair an identified component, and (ii) whether to repeat the causing display of multiple instructional images and, for an additional physical location in the LAN, the invoking the test hardware to perform an additional test, and the automatically evaluating results returned by the additional test;
  proceeding as determined with the report or the repeat; and
  the test sequence includes at least one step that tests connection of the LAN to the WAN, as a LAN-to-WAN test, the LAN-to-WAN test including:
    the multiple instructional images depicting how an operator manually couples the test hardware in connection with the WAN in a position that isolates the LAN from the WAN for evaluation;
    the invoking the test hardware, selecting a test to perform from the test sequence, without intervening user selection of the test from the test sequence, and invoking the test hardware with parameters that control interaction with the WAN; and
    the evaluating results returned by the test hardware, using evaluation criteria of the test sequence, without user interpretation of the results returned, to determine whether to report an evaluation of connection to the WAN.

18. A method of diagnosing faults in a multimedia over at least one WiFi segment of a local area network (LAN) coupled to a wide area network (WAN) comprising:
  responsive to selection of a test sequence, the method running on a processor including repeatedly causing display of multiple instructional images, invoking test hardware to perform a test, automatically evaluating results returned by the test hardware, and either reporting a result or initiating an additional test, wherein:
    at least one pair of WiFi steps in the test sequence tests a WiFi link on the LAN, and that pair of WiFi steps optionally includes user selection of a particular WiFi link to test;
    the multiple instructional images depict how an operator manually couples the test hardware in connection with a wired component and, for at least a pair of tests, also to a wireless component of the LAN in a position that isolates a portion of the LAN for evaluation;
    the invoking the test hardware, automatically selects, in dependence upon a problem generically identified by a user, a test to perform from the test sequence, without intervening user selection of the test from the test sequence, and invokes the test hardware with parameters that control interaction with the LAN components;
    the evaluating results returned by the test hardware, uses evaluation criteria of the test sequence, without user interpretation of the results returned and in dependence upon a threshold associated with the evaluation criteria, to determine at least one of (i) whether to report a recommendation to replace or repair an identified component, and (ii) whether to repeat the causing display of multiple instructional images and, for an additional physical location in the LAN, the invoking the test hardware to perform an additional test, and the automatically evaluating results returned by the additional test;

proceeding as determined with the report or the repeat; and the test sequence includes at least one step that tests connection of the LAN to the WAN, as a LAN-to-WAN test, the LAN-to-WAN test including:

the multiple instructional images depicting how an operator manually couples the test hardware in connection with the WAN in a position that isolates the LAN from the WAN for evaluation;

the invoking the test hardware, selecting a test to perform from the test sequence, without intervening user selection of the test from the test sequence, and invoking the test hardware with parameters that control interaction with the WAN; and the evaluating results returned by the test hardware, using evaluation criteria of the test sequence, without user interpretation of the results returned, to determine whether to report an evaluation of connection to the WAN.

19. A tangible computer readable media impressed with computer instructions that, when executed on a processor, cause the processor and the test hardware to carry out the method of claim 18.

* * * * *